US 011127320B2

(12) United States Patent
Park et al.

(10) Patent No.: US 11,127,320 B2
(45) Date of Patent: ***Sep. 21, 2021

(54) DISPLAY APPARATUS

(71) Applicant: LG Display Co., Ltd., Seoul (KR)

(72) Inventors: GeunChang Park, Paju-si (KR); Taehyung Kim, Paju-si (KR); SunBok Song, Paju-si (KR)

(73) Assignee: LG Display Co., Ltd, Seoul (KR)

( * ) Notice: Subject to any disclaimer, the term of this patent is extended or adjusted under 35 U.S.C. 154(b) by 78 days.

This patent is subject to a terminal disclaimer.

(21) Appl. No.: 16/578,599

(22) Filed: Sep. 23, 2019

(65) Prior Publication Data

US 2020/0160760 A1    May 21, 2020

(30) Foreign Application Priority Data

Nov. 19, 2018 (KR) .......................... 10-2018-0142740

(51) Int. Cl.
 *G09F 9/30* (2006.01)
 *H02K 33/02* (2006.01)

(52) U.S. Cl.
 CPC ............ *G09F 9/301* (2013.01); *H02K 33/02* (2013.01)

(58) Field of Classification Search
 None
 See application file for complete search history.

(56) References Cited

U.S. PATENT DOCUMENTS

| 2011/0132557 A1 | 6/2011 | Kuroi et al. |
| 2017/0161868 A1 | 6/2017 | Kim et al. |
| 2018/0059727 A1 | 3/2018 | Seo et al. |
| 2018/0114471 A1 | 4/2018 | Park et al. |
| 2018/0317011 A1 | 11/2018 | Choi et al. |

FOREIGN PATENT DOCUMENTS

| CN | 107993574 A | 5/2018 |
| CN | 108369789 A | 8/2018 |
| CN | 108683761 A | 10/2018 |
| CN | 108810760 A | 11/2018 |
| EP | 3 316 072 A1 | 5/2018 |
| EP | 3 330 780 A1 | 6/2018 |
| EP | 3 343 272 A1 | 7/2018 |
| WO | 2019/111775 A1 | 6/2019 |

OTHER PUBLICATIONS

Office Action dated May 24, 2021, issued in corresponding Chinese Patent Application No. 201910911949.X.

*Primary Examiner* — Vip Patel

(74) *Attorney, Agent, or Firm* — Morgan, Lewis & Bockius LLP

(57) ABSTRACT

A display apparatus includes a display panel including a plurality of pixels and configured to display an image, a roller on which the display panel is wound or unwound, a rolling module including a structure connected to an upper portion of the display panel and configured to wind or unwind the display panel according to a folding or unfolding of the structure, and a vibration device at the structure. The vibration device is configured to vibrate the display panel when unwound from the roller. The vibration device includes a vibration generator that contacts a contact surface of the display panel and is configured to move to maintain the contact with the contact surface.

28 Claims, 10 Drawing Sheets

DISPLAY APPARATUS

CROSS-REFERENCE TO RELATED APPLICATIONS

This application claims the benefit of and priority to Korean Patent Application No. 10-2018-0142740, filed in Korea on Nov. 19, 2018, the entirety of which is hereby incorporated by reference.

BACKGROUND

Technical Field

The present disclosure relates to a display apparatus.

Discussion of the Related Art

Generally, display apparatuses are widely used as display screens in various products, such as televisions (TVs), notebook computers, and monitors, as well as portable electronic devices.

Recently, display apparatuses including organic light emitting display apparatuses, liquid crystal display (LCD) apparatuses, and electrophoresis display apparatuses have been made thinner. Thus, there has been research and development into implementing the display apparatuses as flexible display apparatuses. For example, research and development is being conducted for rollable display apparatuses that include a flexible display panel capable of being wound like a roll.

In rollable display apparatuses, because sound output from a sound device travels rearward or downward with respect to a housing module, sound quality may be degraded due to interference between sound reflected from a wall or the ground. Therefore, it may be difficult to transfer an accurate sound, and an immersion experience of a viewer is thereby reduced.

SUMMARY

Accordingly, embodiments of the present disclosure are to provide a display apparatus that substantially obviates one or more of the issues due to limitations and disadvantages of the related art.

An aspect of the present disclosure is to provide a display apparatus for outputting sound in a forward region to front of a display panel.

Another aspect of the present disclosure is to provide a rollable display apparatus that outputs sound in a forward region to front of a display panel according to vibrations of the display panel.

Additional features and aspects will be set forth in the description that follows, and in part will be apparent from the description or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus including a display panel including a plurality of pixels and configured to display an image; a roller on which the display panel is wound or unwound; a rolling module including a structure connected to an upper portion of the display panel and configured to wind or unwind the display panel according to a folding or unfolding of the structure; and a vibration device at the structure, the vibration device configured to vibrate the display panel when unwound from the roller, wherein the vibration device includes a vibration generator that contacts a contact surface of the display panel and is configured to move to maintain the contact with the contact surface.

In another aspect, there is provided a display apparatus including a display panel including a plurality of pixels and configured to display an image; a back cover on a rear surface of the display panel; a roller on which the display panel is wound or unwound; a rolling module including a structure connected to an upper portion of the display panel and configured to wind or unwind the display panel according to a folding or unfolding of the structure; and a vibration device at the structure and configured to vibrate the display panel when unwound from the roller, wherein the vibration device includes a sound box connected to the structure; and a vibration generator movable in the sound box and configured to contact the back cover.

The display apparatus according to some embodiments of the present disclosure may output a panel vibration sound generated due to vibration of the unfolded display panel to a forward region in front of a display panel. Thus, the display apparatus according to some embodiments of the present disclosure may provide a more accurate sound to a viewer, thereby increasing the immersion experience of the viewer Further, in the display apparatus according to some embodiments of the present disclosure, the vibration generator may move according to the shape of the contact surface of the display panel. Thus, contact between the vibration generator and the display panel may be increased, and more accurate sound may be output to a forward region in front of a display panel.

Moreover, in the display apparatus according to some embodiments of the present disclosure, the vibration device may move along with unfolding of the display panel. Thus, a panel vibration sound generated by vibration of the unfolded display panel may be output to a forward region in front of a display panel in a full screen mode or a local screen mode of the display panel.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are exemplary and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this application, illustrate embodiments of the disclosure and together with the description serve to explain various principles of the disclosure.

Figure 1:
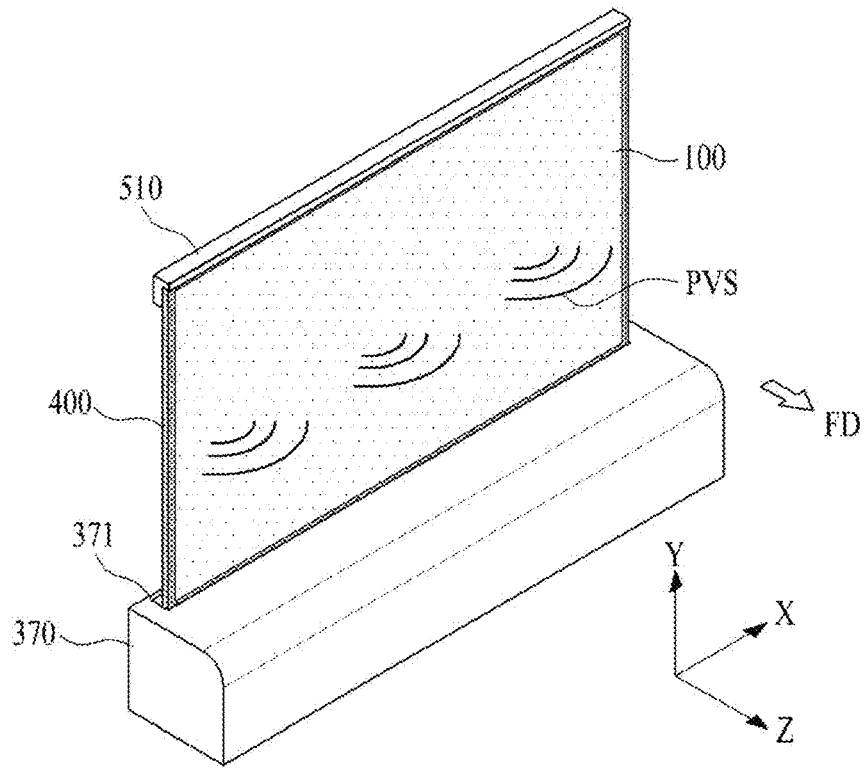
FIG. 1 illustrates a display panel drawn out from a housing module in a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to the embodiments of the present disclosure, examples of which may be illustrated in the accompanying drawings.

In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error range although there is no explicit description.

In describing a position relationship, for example, when a position relation between two parts is described as, for example, "on," "over," "under," and "next" one or more other parts may be disposed between the two parts unless "just" or "direct(ly)" is used.

In describing a time relationship, for example, when the temporal order is described as "after," "subsequent," "next," and "before," a case which is not continuous may be included unless "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display apparatus according to embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

A vibration device may be attached to a display panel that displays images and vibrate the display panel to generate sound. However, if the vibration device is completely attached to the display panel, it may be difficult to move or detach the vibration device. Thus, it may be difficult to implement the vibration device in a flexible display apparatus or the like. Therefore, the inventors of the present disclosure conducted various experiments to implement a detachable vibration device that may be applied to a flexible display apparatus. Through various experiments, a display apparatus including a vibration device of a new structure has been invented, which may be described below.

Figure 2:
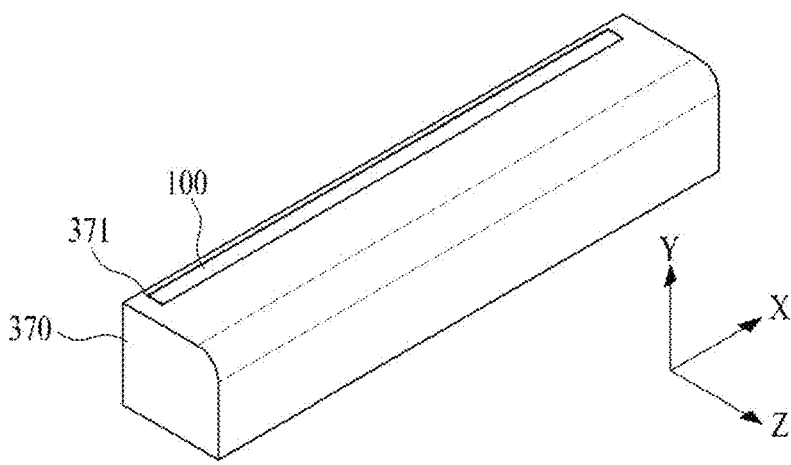
FIG. 2 illustrates a state in which a display panel illustrated in FIG. 1 is drawn into a housing module.
Figure 3:
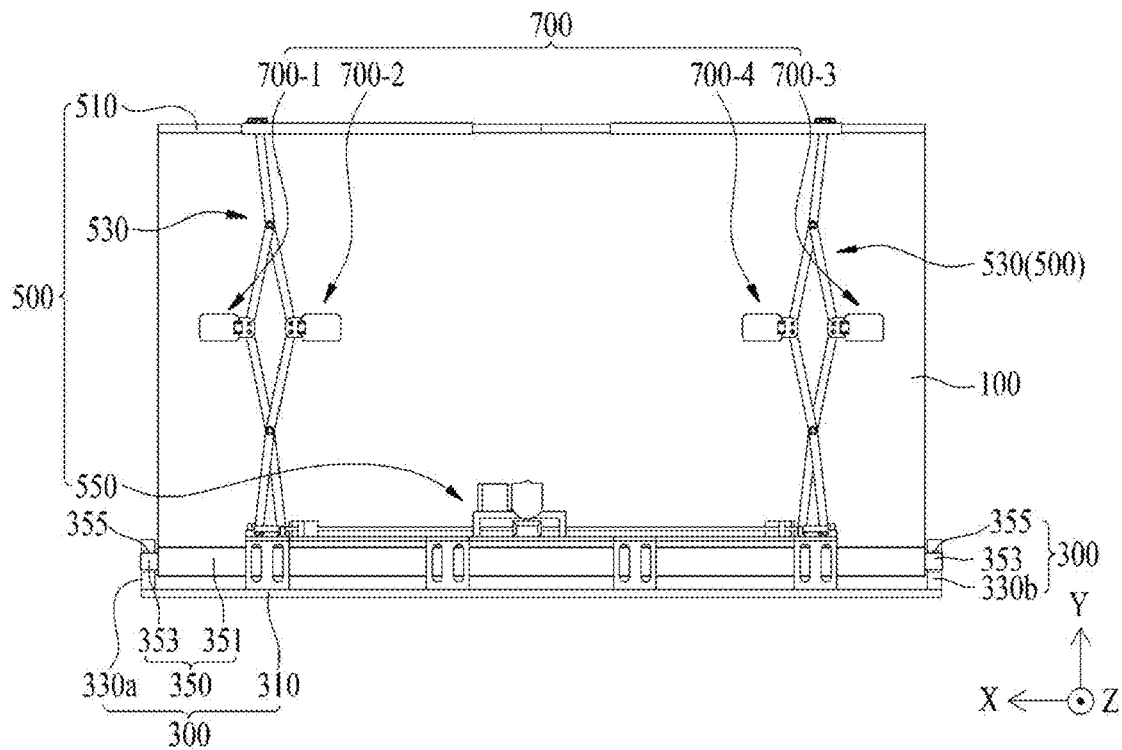
FIG. 3 illustrates a rolling module and a vibration device in a display apparatus according to an embodiment of the present disclosure.

FIG. 1 illustrates a display panel drawn out from a housing module in a display apparatus according to an embodiment of the present disclosure. FIG. 2 illustrates a state in which the display panel illustrated in FIG. 1 is drawn into the housing module. FIG. 3 illustrates a rolling module and a vibration device in a display apparatus according to an embodiment of the present disclosure.

With reference to FIGS. 1 to 3, the display apparatus according to an embodiment of the present disclosure may include a display panel 100, a housing module 300, a rolling module 500, and a vibration device 700. For example, the display apparatus may be a rollable display apparatus, the rolling module 500 may be a panel rolling module, and the vibration device 700 may be a panel vibration device.

The rollable display apparatus may be an apparatus capable of rolling or unrolling the display panel 100. When the user uses the rollable display apparatus, the display panel 100 may need to be maintained in an unrolled state. Therefore, a rolling module 500 for maintaining the unrolled state (or an unfolded state) of the display panel 100 may be included. Accordingly, when a user uses the rollable display apparatus, the user may easily load or unload the display panel from the housing module 300 using the rolling module 500, and may maintain a flat state of the display panel 100.

The display panel 100 according to an embodiment of the present disclosure may include a plurality of pixels that display an image. The display panel 100 may be wound (or loaded) into the housing module 300 according to driving of the rolling module 500, or may be unwound (or unloaded) from the inside of the housing module 300 and may be unfolded in a flat shape. In a state where all or a portion of a display area (or a screen) is unfolded in a flat shape, the display panel 100 may display a two-dimensional (2D) image or a three-dimensional (3D) image including a still image or a moving image. The display area of the display panel 100 unfolded in a flat shape may be vibrated by the vibration device 700 to output a panel vibration sound PVS to a forward region FD where a viewer is located. That is, the forward region FD or a forward direction is a region or direction in which the display panel 100 displays an image.

As an example, the display area of the display panel 100 may be used as a panel speaker (or a vibration plate) that vibrates according to vibration of the vibration device 700 to output sound. As another example, the display area of the unwound display panel 100 may display an image through the pixels, and may vibrate according to vibration of the vibration device 700 to output the panel vibration sound PVS. A panel vibration area of the display panel 100 vibrated by the vibration device 700 may be the entirety of the display area or some portion of the display area, and may be adjusted according to selection of a user (or a viewer). Accordingly, the display apparatus according to an embodiment of the present disclosure may output the panel vibration sound PVS of various sound bands according to a size of the panel vibration area.

The display apparatus according to an embodiment of the present disclosure may be applied to a television, a wallpaper apparatus, a signage device, a game apparatus, a notebook, a monitor, a home appliance, and a lighting apparatus. Also, the display apparatus may be applied to a portable display apparatus and an electronic apparatus.

The display panel 100 according to an embodiment of the present disclosure may be a flexible display panel. For example, the display panel 100 may be a flexible organic light emitting display panel using a flexible substrate, a flexible electrophoretic display panel, a flexible liquid crystal display panel, a flexible electrowetting display panel, a flexible micro light emitting diode display panel, or a flexible quantum dot display panel, but is not limited thereto. The display panel 100 may have a shape, such as a tetragonal (e.g., quadrilateral) shape or a rectangular shape, but is not limited thereto. For example, the display panel 100 may have a circular shape or the like. In the following description, it presumed for convenience of description that the display panel 100 is a flexible organic light emitting display panel.

The housing module 300 may be a main body case of the display apparatus. The housing module 300 may support the rolling module 500 and may be connected to a lower portion of the display panel 100. The housing module 300 according to an embodiment of the present disclosure may include a housing plate 310, a pair of roller brackets 330a and 330b, a roller part 350, and a housing cover 370.

The housing plate 310 may be disposed at the bottom or lower portion of the housing module 300 and may support the rolling module 500.

The roller brackets 330a and 330b may be a pair, may be disposed at both peripheries of the housing plate 310 with respect to a first direction X, and may rotatably support the roller part 350. Here, the first direction X may be a direction parallel to a widthwise direction (or a long-side lengthwise direction) of the display panel 100.

The roller part 350 may be rotatably disposed between the pair of roller brackets 330a and 330b and may interlink with the driving of the rolling module 500 to wind or unwind the display panel 100. The roller part 350 according to an embodiment of the present disclosure may include a rolling roller 351 connected to the lower portion of the display panel 100, and a roller shaft 353 disposed on both sides or both portions of the rolling roller 351 and rotatably disposed on the pair of roller brackets 330a and 330b. The roller shaft 353 may be configured as a pair so as to be rotatable to correspond to the pair of roller brackets 330a and 330b.

The rolling roller 351 may have a cylindrical shape, but is not limited thereto, and may have various shapes capable of winding the display panel 100. Each of the pair of roller shafts 353 may be rotatably disposed on the pair of roller brackets 330a and 330b through a bearing 355, which is, for example, a rolling bearing.

The roller part 350 may further include a spiral spring, which is disposed inside the rolling roller 351 or inside each of the pair of roller brackets 330a and 330b. One portion of the spiral spring may be fixed to the roller shaft 353, and the other portion of the spiral spring may be fixed to an inner surface of the rolling roller 351. The spiral spring may be compressed when the display panel 100 wound around the rolling roller 351 is unwound, and may provide a rotational force in accordance with a compressive restoring force when the display panel 100 is wound to the rolling roller 351, thereby reducing a load of the rolling module 500 when the display panel 100 is wound. Accordingly, the display panel 100 may be wound along an outer circumferential surface of the rolling roller 351 by the unwinding driving of the rolling module 500 and the rotational force based on the compressive restoring force of the spiral spring.

The housing cover 370 may cover the pair of roller brackets 330a and 330b and the roller part 350 on the housing plate 310, and thereby prevent or reduce the housing plate 310 and the pair of roller brackets 330a and 330b from being externally exposed. The housing cover 370 may include a panel entrance 371 through which the display panel 100 moves in or out.

The rolling module 500 may be on the housing module 300 and wind or unwind the display panel 100 to or from the roller part 350 of the housing module 300 according to the folding or unfolding of a structure 530 coupled or connected to the upper portion of the display panel 100. The rolling module 500 may support the vibration device 700, thereby allowing the vibration device 700 to contact a rear surface of the display panel 100, which is unfolded in a flat or plane shape. The rolling module 500 according to an embodiment of the present disclosure may include a supporting frame 510, the structure 530, and a driving unit 550.

The supporting frame 510 may be disposed on the upper portion of the display panel 100. The supporting frame 510 according to an embodiment of the present disclosure may be disposed to cover a front periphery portion of an upper portion of the display panel 100. Further, the supporting frame 510 according to an embodiment of the present disclosure may be disposed to additionally cover a periphery portion of the upper portion including an upper surface and a rear periphery portion of the upper portion of the display panel 100.

The structure 530 may be connected to the upper portion of the display panel 100, and may be folded or unfolded to allow the display panel 100 to be wound around or unwound from the rolling roller 351 of the roller part 350 according to driving of the driving unit 550. The structure 530 may be connected to the supporting frame 510 to support the upper portion of the display panel 100. For example, the structure 530 may be connected between the supporting frame 510 and the driving unit 550 and may be folded or unfolded along a second direction Y of the display panel 100 according to driving of the driving unit 550, thereby moving the display panel 100 upward and downward. The display panel 100 may move upward and downward according to the folding or unfolding of at least one structure 530 connected between the supporting frame 510 and the driving unit 550, and thus, may be wound around or unwound from the rolling roller 351 of the roller part 350. Here, the second direction Y may be a direction parallel to the lengthwise direction (or the short-side lengthwise direction) of the display panel 100.

The structure 530 according to an embodiment of the present disclosure may include a plurality of links that are rotatably connected to a plurality of link connection parts, respectively, and rotatably intersect one another in an X-shape using a link hinge. The link connection part of the structure 530 may support the vibration device 700. The structure 530 may be referred to as a retractable structure (or a retractable unit) or a pantograph, but the term is not limited thereto. Here, the vibration device 700 may not be connected to the link connection parts of the structure 530, but may be supported by at least one of the plurality of links. For example, when the plurality of links intersecting one another in an X-shape are folded, the vibration device 700 may be damaged by the folding of the links. Thus, the vibration device 700 may be connected to the link connection parts of the structure 530, which rotatably supports the links.

The driving unit 550 may be on the housing module 300, and may fold or unfold the structure 530. The driving unit 550 according to an embodiment of the present disclosure may fold or unfold the structure 530 using a driving motor and a ball screw. For example, the driving unit 550 may fold the structure 530 according to panel winding driving based on a first-direction rotation of the driving motor. Thus, the display panel 100 may be wound around (or accommodated into) the rolling roller 351 of the roller part 350. Also, the driving unit 550 may unfold the structure 530 according to panel unwinding driving based on a second-direction rotation of the driving motor opposite to the first-direction rotation. Thus, the display panel 100 wound around the rolling roller 351 may be unwound (or unloaded), thereby unfolding the entire display panel or some portion of the display panel 100 in a flat or plane state.

The vibration device 700 may be on the structure 530, and may vibrate the display panel 100 which is unwound from the rolling roller 351 of the roller part 350 and unfolded. The display panel 100 may output a panel vibration sound PVS generated in an unfolded display area by the vibration of the vibration device 700 to the forward region FD of the unfolded display area. For example, the vibration device 700 may be rotatably disposed on at least one of the link connection parts configuring the structure 530, and may directly vibrate the unfolded display panel 100.

The panel vibration area of the display panel 100 vibrated by the vibration device 700 may be changed according to a folding (or unfolding) distance of the structure 530. For example, the vibration device 700 according to an embodiment of the present disclosure is disposed in the structure 530. Thus, the vibration device 700 may move upward and downward (or moved) along with folding or unfolding of the structure 530, whereby a contact area between the vibration device 700 and the display panel 100 may be changed based on an unwinding length (or a loading length) of the display panel 100. For example, the contact area between the vibration device 700 and the display panel 100 may be adjusted to a middle area (or an intermediate area) of the unwinding length (or loading length) of the display panel 100, for uniform vibration of the display panel 100, but is not limited thereto.

The display apparatus according to an embodiment of the present disclosure may further include a protective member 400. The protective member 400 may be disposed on each of both externally exposed sides of the display panel 100, and may protect both sides of the display panel 100 from external impacts. The protective member 400 according to an embodiment of the present disclosure may include a plurality of rotation blocks that are rolled based on rolling (winding or unwinding) of the display panel 100.

In the display apparatus according to an embodiment of the present disclosure, the display panel 100 unwound from the housing module 300 and unfolded may vibrate by the vibration device 700 disposed in the structure 530 of the rolling module 500. Thus, the display apparatus may output the panel vibration sound PVS, generated by a vibration of the display panel 100, to a forward region FD of the display panel 100, thereby providing a more accurate sound to a viewer and increasing an immersion experience of the viewer.

Figure 4:
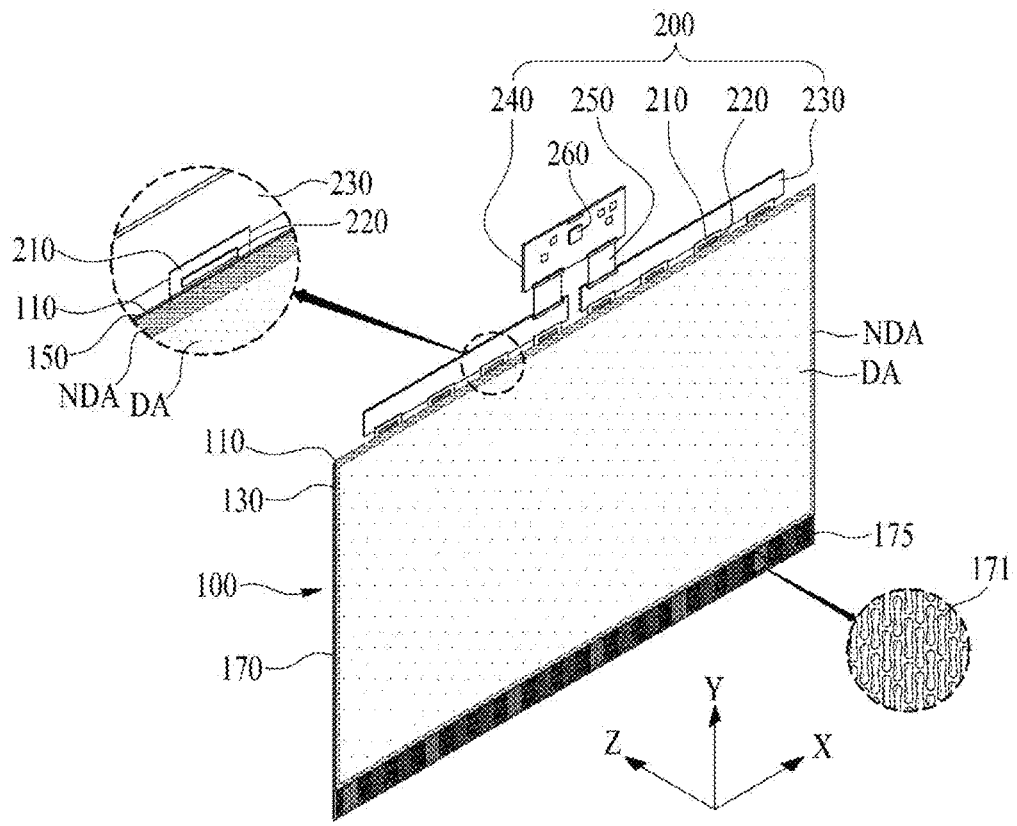
FIG. 4 illustrates a display panel and a panel driving circuit illustrated in FIG. 3.

FIG. 4 illustrates a display panel and a panel driving circuit illustrated in FIG. 3.

With reference to FIG. 4 in association with FIG. 3, the display panel 100 according to an embodiment of the present disclosure may include a pixel array substrate 110 and an encapsulation substrate 130.

The pixel array substrate 110 may be a flexible plastic substrate or a flexible glass substrate, but is not limited thereto. The pixel array substrate 110 may include a display area DA, a non-display area NDA, a pixel array layer, a protective layer, and a pad part.

The display area DA, which is an area configured to display an image, may be a center portion of the pixel array substrate 110. The non-display area NDA, which is an area where no image is displayed, may be a periphery portion of the pixel array substrate 110 surrounding the display area DA.

The pixel array layer may include a plurality of pixels that are arranged in a pixel area by a plurality of gate lines and a plurality of data lines disposed on the display area DA. The pixel array layer may include a plurality of pixel driving power lines arranged on the display area DA and connected to the pixels.

Each of the plurality of pixels according to an embodiment of the present disclosure may include a pixel driving circuit and a self-emitting element (or a self-emitting device). The pixel driving circuit may allow the self-emitting element to emit light, based on a data signal supplied through a corresponding data line. The pixel driving circuit may include a driving thin film transistor (TFT) which supplies a data current, corresponding to the data signal, to the self-emitting element. The self-emitting element may emit light proportional to the amount of current supplied from the pixel driving circuit and may include an organic light emitting element layer (or an organic light emitting device layer), a quantum dot light emitting element layer, or a light emitting diode (LED) chip. Each of the plurality of pixels may have a bottom emission structure where light is output (or exiting) to the outside through the flexible substrate, but is not limited thereto and may have a top emission structure where light is output (or exiting) to the outside in a direction opposite to a direction toward the flexible substrate. Alternately, each pixel may have a dual emission structure where light is output (or exiting) to the outside in the direction toward the flexible substrate and in the direction opposite to the direction toward the flexible substrate.

The protective layer (or a passivation layer) may be formed on the flexible substrate to surround the pixel array layer. The protective layer may prevent oxygen or water (or moisture) from penetrating into the self-emitting element. The protective layer according to an embodiment of the present disclosure may include at least one inorganic layer. The inorganic layer may be formed of silicon nitride, aluminum nitride, zirconium nitride, titanium nitride, hafnium nitride, tantalum nitride, silicon oxide, aluminum oxide, or titanium oxide, but is not limited thereto. The protective layer according to an embodiment of the present disclosure may further include at least one organic layer. The organic layer may be formed to be relatively thicker than an inorganic material layer in order to cover particles that may occur during a manufacturing process. The protective layer may be expressed an encapsulating layer.

The pad part may be connected to a plurality of data lines provided in a first non-display area of the non-display area NDA and arranged in the display area DA. Here, the first non-display area may be an upper periphery portion of the pixel array substrate 110 having a relatively long length.

The display panel 100 according to an embodiment of the present disclosure may further include a gate driving circuit in the pixel array substrate 110. The gate driving circuit may be in the non-display area NDA of the pixel array substrate 110. The gate driving circuit may generate a gate signal according to a gate control signal provided from the outside through the pad part and supply the gate signal to a gate line corresponding to a predetermined order. The gate driving circuit according to an embodiment of the present disclosure may be formed in the non-display area NDA of the pixel array substrate 110 together with the driving TFT. For example, the gate driving circuit may be disposed in at least one of a second non-display area and a third non-display area of the pixel array substrate 110. Here, the second non-display area may be a left periphery portion of the pixel array substrate 110 having a relatively shorter length than the first non-display area, and the third non-display area may be a right periphery portion of the pixel array substrate 110 parallel to the second non-display area.

The encapsulation substrate 130 may cover a front surface of the pixel array substrate 110 except the first non-display area of the pixel array substrate 110. The encapsulation substrate 130 may be attached to the front surface of the pixel array substrate 110 by an adhesive or a filler. The encapsulation substrate 130 may prevent oxygen or water (or moisture) from penetrating into the self-emitting element. The encapsulation substrate 130 according to an embodiment of the present disclosure may have a thickness of 100 micrometers or less so as to prevent penetration of oxygen or water (or moisture) and enable the display panel 100 to be bent, but the thickness is not limited thereto.

The encapsulation substrate 130 and/or the pixel array substrate 110 according to an embodiment of the present disclosure may be vibrated by the vibration device 700, to serve as a vibration plate of a panel speaker. For example, the encapsulation substrate 130 according to an embodiment of the present disclosure may be formed of any one of a magnesium (Mg) alloy material, a Mg-lithium (Li) alloy material, and an aluminum (Al) alloy material, but is not limited thereto. For example, the Mg alloy material may include at least one of Al, zinc (Zn), and manganese (Mn). The Mg alloy material may be a lightest material among metal materials usable as the vibration plate of a speaker, may have relatively high non-rigidity (stiffness/specific gravity) and relatively high vibration damping ability (ability to absorb and progressively reduce vibration), and may be good in dimension stability with respect to a variation of a temperature and the elapse of time.

Because the encapsulation substrate 130 according to an embodiment of the present disclosure may be formed of one of a Mg alloy material, a Mg—Li alloy material, and an Al alloy material, a fine sound may be realized due to a reactivity (a response time) of a fast sound based on a low density, and a sound having a whole sound band including a low-pitched sound band to a high-pitched sound band may be realized based on a fast sound speed due to high non-rigidity. Also, because internal loss is large due to high vibration ability, undesired vibration may not occur. Thus, a residual sound and a reflected sound or a resonance sound are suppressed or reduced, thereby enabling an original sound to be reproduced or generated. Also, the vibration plate 200 may have high elasticity, and thus, a high-resolution tone may be realized or generated.

The display panel 100 according to an embodiment of the present disclosure may further include a transmissive or transparent film 150 attached to the pixel array substrate 110. The transmissive film 150 may be attached to the front surface of the pixel array substrate 110 by a transparent adhesive layer, and thus, may protect a light output surface of the display panel 100 and may increase a rigidity of a front surface of the display panel 100. The transmissive film 150 according to an embodiment of the present disclosure may be formed of a flexible film. For example, the transmissive film 150 may be formed of at least one of a polyethylene terephthalate film, an antireflection film, a polarizing film, and a transmittance controllable film, but is not limited thereto.

The display panel 100 according to an embodiment of the present disclosure may further include a touch panel for a user interface using a user's touch. The touch panel may be interposed between the pixel array substrate 110 and the transmissive film 150, or may be embedded into the flexible display panel 100 through a process of manufacturing the pixel array substrate 110 according to an in-cell touch method. For example, a touch electrode layer according to an in-cell touch method may include mutual capacitance type touch electrodes or self-capacitance type touch electrodes. The touch electrode layer may be formed on the protective layer through the process of manufacturing the pixel array substrate 110.

The display panel 100 according to an embodiment of the present disclosure may further include a back cover 170. The back cover 170 may be arranged at a rear surface or a rear side of the display panel 100 or may be coupled or connected to a rear surface (or back surface) of the display panel 100. For example, the back cover 170 may be attached to the rear surface (or back surface) of the encapsulation substrate 130 by an adhesive member. The back cover 170 may support the display panel 100 and increase a rigidity of a rear side and lateral side of the display panel 100 from external physical impacts. For example, the adhesive member may be optically clear adhesive (OCA), optically clear resin (OCR), or pressure sensitive adhesive (PSA). The adhesive layer may be a cover bonding member.

The back cover 170 according to an embodiment of the present disclosure may include a thin metal plate formed of a metal material. The back cover 170 according to another embodiment of the present disclosure may include a mesh plate or a porous plate having a plurality of open portions 171. For example, the back cover 170 may be formed of any one material of Al material, Mg material, Al alloy material, Mg alloy material, and Mg—Li alloy material.

The back cover 170 may be connected to the roller part 350 of the housing module 300. For example, the lower portion of the back cover 170 may be connected to the rolling roller 351 of the roller part 350 in the housing module 300. The back cover 170 according to an embodiment of the present disclosure may further include a cover extending portion 175 extending to be connected with the rolling roller 351 of the roller part 350.

The cover extending portion 175 may extend from a lower end or a lower portion overlapping the display panel 100 to have a length equal to or greater than a distance between the panel entrance 371 and the rolling roller 351 of the housing module 300. The cover extending portion 175 may be used to connect the display panel 100 and the roller part 350 and to prevent a lower area of the display area DA from being covered by the housing module 300 when the whole display area DA of the display panel 100 is unfolded in a flat or plane shape. For example, when the whole display area DA of the display panel 100 is unfolded in a flat or plane shape, the cover extending portion 175 may be positioned within the panel entrance 371 of the housing module 300 or on the panel entrance 371.

The display apparatus according to an embodiment of the present disclosure may further include a driving circuit unit 200 connected to the display panel 100. The driving circuit unit 200 may drive the plurality of pixels provided on the display panel 100 to display an image on the display panel 100. For example, the driving circuit unit 200 may be on a rear surface of upper portion of the display panel 100 and may be covered by the supporting frame 510 of the rolling module 500.

The driving circuit unit 200 according to an embodiment of the present disclosure may include a plurality of flexible circuit films 210, a data driving integrated circuit (IC) 220, a printed circuit board (PCB) 230, and a control board 240.

Each of the plurality of flexible circuit films 210 may be attached between the pad part of the pixel array substrate 110 and the PCB 230 through a film attachment process and may be formed of a tape carrier package (TCP) or a chip on flexible board (or a chip on film) (COF), but the present disclosure is not limited thereto.

The data driving IC 220 may be provided in plurality, and the plurality of data driving ICs 220 may be respectively mounted on the plurality of flexible circuit films 210 and may be connected to the pad part through the flexible circuit films 210. The data driving IC 220 may receive pixel-based pixel data and a data control signal supplied from the control board 240, convert the pixel-based pixel data into an analog data signal according to the data control signal, and supply the analog data signal to a corresponding data line through the pad part.

The PCB 230 may be connected to the plurality of data flexible circuit films 210. The PCB 230 may supply a driving power and signals, supplied from the control board 240, to the data driving IC 220 and the gate driving circuit so as to display an image on each of the plurality of pixels. For example, signal transmission lines and various power lines may be provided on the PCB 230. The PCB 230 may be provided as one or more, based on the number of flexible circuit films 210.

The control board 240 may be connected to the PCB 230 through a signal cable 250. A timing control circuit 260, various power supply circuits, memory devices, and the like, may be mounted on the control board 240.

The timing control circuit 260 may align digital video data input from a host system (or a driving system) of the display apparatus according to a pixel arrangement structure to generate pixel-based pixel data and may supply the generated pixel-based pixel data to the data driving IC 220. Also, the timing control circuit 260 may generate the data control signal and a gate control signal, based on the timing synchronization signal supplied from the host system, and thus, the timing control circuit 260 may control a driving timing of the data driving IC 220 using the data control signal and may control a driving timing of the gate driving circuit using the gate control signal. The timing control circuit 260 may be implemented as an IC or a semiconductor chip and may be mounted on the control board 240 or the PCB 230.

Figure 5:
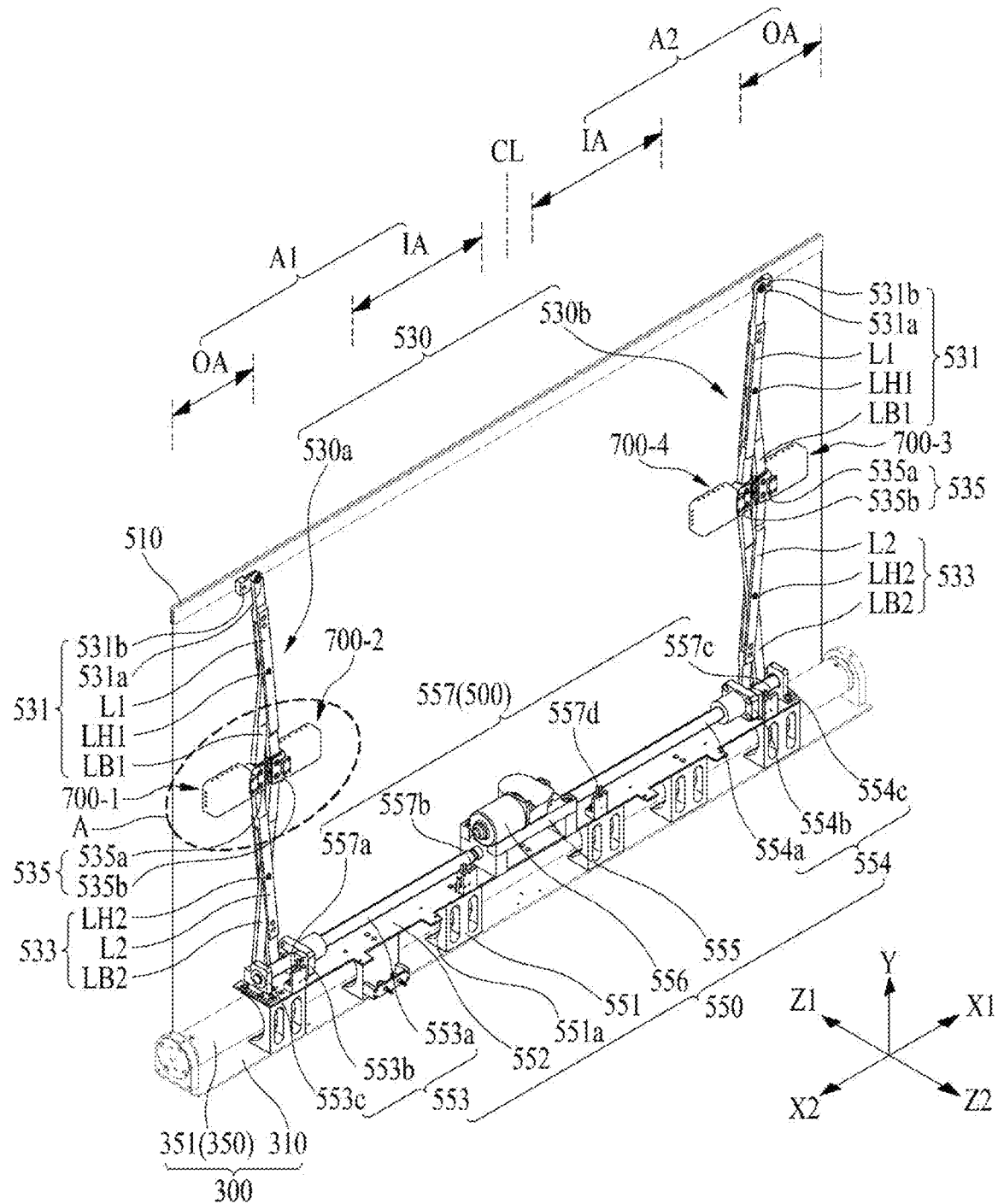
FIG. 5 illustrates an unfolded state of a structure in a rolling module according to an embodiment of the present disclosure.
Figure 6:
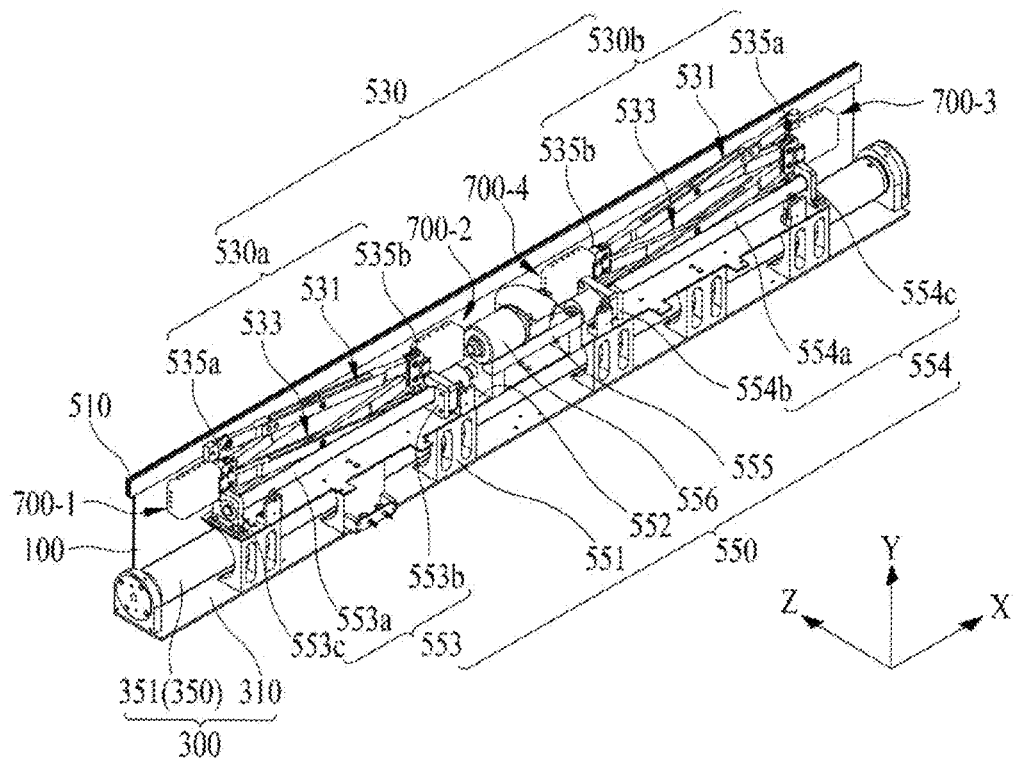
FIG. 6 illustrates a folded state of a structure in a rolling module according to an embodiment of the present disclosure.
Figure 7:
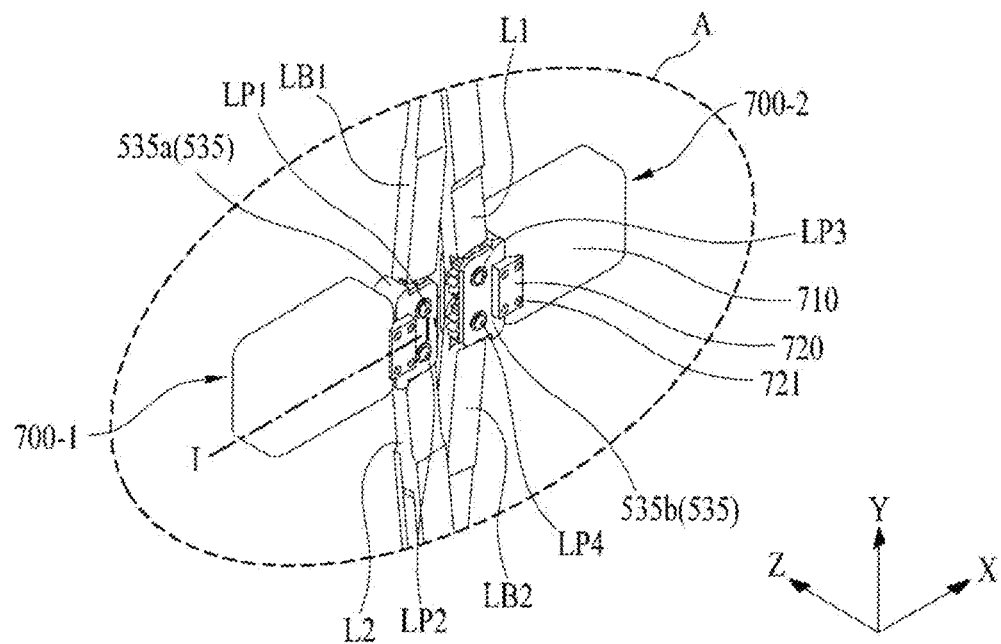
FIG. 7 is an enlarged view of a portion 'A' illustrated in FIG. 5.

FIG. 5 illustrates an unfolded state of a structure in a rolling module according to an embodiment of the present disclosure. FIG. 6 illustrates a folded state of a structure in a rolling module according to an embodiment of the present disclosure. FIG. 7 is an enlarged view of a portion 'A' illustrated in FIG. 5. FIGS. 5 to 7 illustrate a rolling module according to an embodiment of the present disclosure illustrated in FIG. 3.

With reference to FIGS. 5 to 7 together with FIG. 3, the rolling module 500 according to an embodiment of the present disclosure may include a supporting frame 510, a structure 530, and a driving unit 550.

The supporting frame 510 may be disposed on the upper portion of the display panel 100 to cover the periphery portion of the upper portion of the display panel 100, thereby covering the panel driving circuit portion connected to the display panel 100. The supporting frame 510 may have a bar shape covering the periphery portion of the upper portion of the display panel 100.

The structures 530 may include first and second structures 530a and 530b disposed to be parallel to each other, and connected between the supporting frame 510 and the driving unit 550.

The first structure 530a may be connected between one portion (or a first portion) of the supporting frame 510 and the driving unit 550, and may be folded or unfolded according to driving of the driving unit 550. The first structure 530a may support the vibration device 700. The first structure 530a according to an embodiment of the present disclosure may include a first link part 531 having a first portion connected to the supporting frame 510, a second link part 533 having a first portion connected to the driving unit 550, and a link connection part 535, which rotatably supports a second portion of the first link part 531 and a second portion of the second link part 533 and supports the vibration device 700.

The first link part 531 may be connected to the supporting frame 510 so as to be folded or unfolded. The first link part 531 according to an embodiment of the present disclosure may include a first link L1 rotatably disposed on the one portion of the supporting frame 510 and a first link bar LB1 rotatably disposed on the first link L1.

The first link L1 may be rotatably disposed on the one portion of the supporting frame 510 by a link rotation shaft 531a. The first link L1 according to an embodiment of the present disclosure may include a first portion rotatably connected to the one portion of the supporting frame 510, a second portion rotatably connected to the link connection part 535, and a middle portion having a hollow portion between the first portion and the second portion. The first link L1 may have a rectilinear (or a linear) shape or a non-rectilinear (or a non-linear) shape each having a predetermined length, based on a distance between the one portion of the supporting frame 510 and the link connection part 535. For example, first link L1 having the non-rectilinear shape or a non-linear shape may include a bent portion in the middle portion.

The link rotation shaft 531a may pass through the first portion of the first link L1 and may be fixed to the one portion of the supporting frame 510, thereby rotatably supporting the first link L1.

The first link part 531 may further include a link supporting block 531b that supports the link rotation shaft 531a. The link supporting block 531b may be on the one portion of the supporting frame 510 to rotatably support the link rotation shaft 531a. In this case, the link rotation shaft 531a may pass through the first portion of the first link L1 and may be fixed to the link supporting block 531b, thereby rotatably supporting the first link L1.

The first link bar LB1 may be rotatably disposed on the first link L1 using a first link hinge LH1. The first link bar LB1 according to an embodiment of the present disclosure may include a first portion inserted or accommodated into the hollow portion of the first link L1 and rotatably connected to the first link hinge LH1, a second portion connected to the link connection part 535, and a middle portion between the first portion and the second portion. The first portion and the middle portion of the first link bar LB1 may each have a thickness which enables each of the first portion and the middle portion to be inserted or accommodated into the hollow portion of the first link L1.

The first link hinge LH1 may pass through the middle portion of the first link L1 and may rotatably support the first portion of the first link bar LB1 inserted or accommodated into the hollow portion of the first link L1. The first link hinge LH1 may rotatably support the first portion of the first link bar LB1 at a center portion of the first link L1 with respect to a lengthwise direction of the first link L1.

The second link part 533 may be connected to the driving unit 550 so as to be folded or unfolded. The second link part 533 according to an embodiment of the present disclosure may include a second link L2 rotatably disposed in the driving unit 550 and a second link bar LB2 rotatably connected to the driving unit 550 and rotatably disposed in the second link L2. For example, the second link L2 and the second link bar LB2 may be rotatably connected to each other in an X-shape, but are not limited thereto.

The second link L2 may be rotatably disposed on the driving unit 550 and may move in the first direction X according to driving of the driving unit 550. The second link L2 according to an embodiment of the present disclosure may include a first portion rotatably connected to the driving unit 550, a second portion rotatably connected to the link connection part 535, and a middle portion having a hollow portion between the first portion and the second portion. The second link L2 may have a rectilinear (or a linear) shape or a non-rectilinear (or a non-linear) shape each having a predetermined length, based on a distance between the driving unit 550 and the link connection part 535. For example, the second link L2 having the non-rectilinear shape or a non-linear shape may include a bent portion in the middle portion.

The second link bar LB2 may intersect the second link L2 and may be rotatably disposed on the second link L2 using the second link hinge LH2. The second link bar LB2 according to an embodiment of the present disclosure includes a first portion rotatably connected to the driving unit 550, a second portion rotatably connected to the link connection part 535 through the hollow portion of the second link L2, and a middle portion between the first portion and the second portion. The middle portion of the second link bar LB2, which is inserted or accommodated into the hollow portion of the second link L2, may have a thickness which enables the middle portion to be inserted or accommodated into the hollow portion of the second link L2.

The second link hinge LH2 may pass through the middle portion of the second link L2 and may rotatably support the middle portion of the second link bar LB2 inserted or accommodated into the hollow portion of the second link L2. The second link hinge LH2 may rotatably support a center of the middle portion of the second link bar LB2 at a center portion of the second link L2 with respect to a lengthwise direction of the second link bar LB2.

The link connection part 535 may include a first joint member 535a, which rotatably supports the first link bar LB1 of the first link part 531 and the second link L2 of the second link part 533, and a second joint member 535b, which rotatably supports the first link L1 of the first link part 531 and the second link bar LB2 of the second link part 533.

The first joint member 535a may rotatably support the first link bar LB1 of the first link part 531 using a first link pin LP1 and may support the vibration device 700. The first link pin LP1 may pass through one portion of the first joint member 535a and may rotatably support a second portion of the first link bar LB1 of the first link part 531

The first joint member 535*a* may rotatably support the second link L2 of the second link part 533 using a second link pin LP2 and may support the vibration device 700. The second link pin LP2 may pass through the other portion of the first joint member 535*a* and may rotatably support the second portion of the second link L2 of the second link part 533.

The second portion of the first link bar LB1 and the second portion of the second link L2, which are rotatably connected to the first joint member 535*a*, may be rotatably connected to each other. For example, the second portion of the first link bar LB1 and the second portion of the second link L2 may each have a gear structure, and thus, the second portion of the first link bar LB1 and the second portion of the second link L2 may rotate in engagement with each other. In this case, the rotation of the second link L2 may be more stably transferred to the first link bar LB1.

The second joint member 535*b* rotatably support the first link L1 of the first link part 531 using a third link pin LP3 and may support the vibration device 700. The third link pin LP3 may pass through one portion of the second joint member 535*b* and may rotatably support the second portion of the first link L1 of the first link part 531.

The second joint member 535*b* may rotatably support the second link bar LB2 of the second link part 533 using a fourth link pin LP4 and may support the vibration device 700. The fourth link pin LP4 may pass through the other portion of the second joint member 535*b* and may rotatably support the second portion of the second link bar LB2 of the second link part 533.

The second portion of the first link L1 and the second portion of the second link bar LB2, which are rotatably connected to the second joint member 535*b*, may be rotatably connected to each other. For example, the second portion of the first link L1 and the second portion of the second link bar LB2 may each have a gear structure, and thus, the second portion of the first link L1 and the second portion of the second link bar LB2 may rotate in engagement with each other. In this case, the rotation of the second link bar LB2 may be more stably transferred to the first link L1.

The second structure 530*b* may be connected between the other portion (or a second portion) of the supporting frame 510 and the driving unit 550 in parallel with the first structure 530*a*, may be folded or unfolded according to driving of the driving unit 550, and may support the vibration device 700. The second structure 530*b* according to an embodiment of the present disclosure may include a first link part 531 having a first portion connected to the supporting frame 510, a second link part 533 having a first portion connected to the driving unit 550, and a link connection part 535, which rotatably supports the second portion of the first link part 531 and the second portion of the second link part 533 and supports the vibration device 700. Except that the first link part 531, the second link part 533, and the link connection part 535 of the second structure 530*b* are connected between the other portion of the supporting frame 510 and the driving unit 550, the first link part 531, the second link part 533, and the link connection part 535 of the second structure 530*b* are the same as the first link part 531, the second link part 533, and the link connection part 535 of the first structure 530*a*, and thus, like reference numeral refer to like elements and repetitive descriptions are omitted.

The driving unit 550 may simultaneously fold or unfold in response to a manipulation of the user (or the viewer), thereby winding or unwinding the display panel 100 connected to the first structure 530*a* and the second structure 530*b*. The driving unit 550 according to an embodiment of the present disclosure may include a plurality of fixing members 551, a supporting plate 552, a first driving unit 553, a second driving unit 554, a power transfer unit 555, and a driving motor 556.

The plurality of fixing members 551 may be arranged at certain intervals or distances in the housing plate 310 of the housing module 300. Each of the plurality of fixing members 551 may surround a portion (or some portion) of the rolling roller 351 of the housing module 300. For example, an inner side of each of the plurality of fixing members 551 may have a curved shape (or a rounded portion 551*a*) surrounding the portion of the rolling roller 351 and may be spaced apart from an outer circumference of the rolling roller 351 by a certain distance. The inner side of each of the plurality of fixing members 551 and the outer circumferential surface of the rolling roller 351 may be spaced apart from each other by a distance which is equal to or greater than a winding thickness of the display panel 100 wound around the rolling roller 351.

The supporting plate 552 may be disposed on the plurality of fixing members 551 and disposed on the rolling roller 351. The supporting plate 552 may support the first driving unit 553, the second driving unit 554, and the power transfer unit 555.

The first driving unit 553 may fold or unfold the first structure 530*a* by power transferred from the power transfer unit 555. The first driving unit 553 according to an embodiment of the present disclosure may include a first ball screw 553*a*, a first ball catch 553*b*, and a first link bracket 553*c*.

The first ball screw 553*a* may be disposed on the supporting plate 552 and may be rotatably supported on each of the power transfer unit 555 and the first link bracket 553*c*. For example, one portion of the first ball screw 553*a* may be rotatably connected to the power transfer unit 555, and the other portion of the first ball screw 553*a* may be rotatably supported by the first link bracket 553*c*.

The first ball catch 553*b* may be movably fastened to the first ball screw 553*a* and may rotatably support the first portion of the second link L2 of the second link part 533 in the first structure 530*a*. The first ball catch 553*b* may perform a rectilinear motion in a first direction X on the first ball screw 553*a* by a rotational motion of the first ball screw 553*a* to allow the second link L2 of the second link part 533 to perform a rectilinear motion in the first direction X.

The first link bracket 553*c* may be disposed at one periphery portion of the supporting plate 552, may rotatably support the other portion of the first ball screw 553*a*, and may rotatably support the first portion of the second link bar LB2 of the second link part 533 in the first structure 530*a*.

The first driving unit 553 may move the first portion of the second link L2 of the second link part 533 in the first structure 530*a* in the first rectilinear direction X1, based on a rectilinear motion of the first ball catch 553*b* performed in the first rectilinear direction X1 based on a first-direction rotation of the first ball screw 553*a*, thereby folding the first structure 530*a*, as illustrated in FIG. 6. At this time, as the first portion of the second link L2 of the second link part 533 moves in the first rectilinear direction X1, the second link part 533 of the first structure 530*a* may be folded with reference to the second link hinge LH2, and the first link part 531 of the first structure 530*a* may be folded with reference to the first link hinge LH1 according to the folding of the second link part 533 transferred through the link connection part 535.

On the other hand, the first driving unit 553 may move the first portion of the second link L2 of the second link part 533 in the first structure 530*a* in a second rectilinear direction X2, based on a rectilinear motion of the first ball catch 553b performed in the second rectilinear direction X2 opposite to the first rectilinear direction X1 based on a second-direction rotation, which is opposite to the first-direction rotation, of the first ball screw 553a, thereby unfolding the first structure 530a, as illustrated in FIG. 5. At this time, as the first portion of the second link L2 of the second link part 533 moves in the second rectilinear direction X2, the second link part 533 of the first structure 530a may be unfolded with reference to the second link hinge LH2, and the first link part 531 of the first structure 530a may be unfolded with reference to the first link hinge LH1 according to the unfolding of the second link part 533 transferred through the link connection part 535.

The second driving unit 554 may fold or unfold the second structure 530b, based on power transferred from the power transfer unit 555. The second driving unit 554 according to an embodiment of the present disclosure may include a second ball screw 554a, a second ball catch 554b, and a second link bracket 554c.

The second ball screw 554a may be on the supporting plate 552 and may be rotatably supported by the power transfer unit 555 and the second link bracket 554c. For example, one end of the second ball screw 554a may be rotatably connected to the power transfer unit 555, and the other end of the second ball screw 554a may be rotatably supported by the second link bracket 554c.

The second ball catch 554b may be movably fastened to the second ball screw 554a and may rotatably support the first portion of the second link L2 of the second link part 533 included in the second structure 530b. The second ball catch 554b may perform a rectilinear motion in the first direction X on the second ball screw 554a on the basis of a rotational motion of the second ball screw 554a to allow the second link L2 of the second link part 533 to perform a rectilinear motion in the first direction X.

The second link bracket 554c may be disposed at the other side periphery of the supporting plate 552, may rotatably support the other end of the second ball screw 554a, and may rotatably support the first portion of the second link bar LB2 of the second link part 533 in the second structure 530b.

The second driving unit 554 may move the first portion of the second link L2 of the second link part 533 in the second structure 530b in the second rectilinear direction X2, based on a rectilinear motion of the second ball catch 554b performed in the second rectilinear direction X2 based on a second-direction rotation of the second ball screw 554a, thereby folding the second structure 530b, as illustrated in FIG. 6. At this time, as the first portion of the second link L2 of the second link part 533 moves in the second rectilinear direction X2, the second link part 533 of the second structure 530b may be folded with reference to the second link hinge LH2, and the first link part 531 of the second structure 530b may be folded with reference to the first link hinge LH1 according to the folding of the second link part 533 transferred through the link connection part 535.

On the other hand, the second driving unit 554 may move the first portion of the second link L2 of the second link part 533 in the second structure 530b in the first rectilinear direction X1, based on a rectilinear motion of the second ball catch 554b performed in the first rectilinear direction X1 based on a first-direction rotation of the second ball screw 554a, thereby unfolding the second structure 530b as illustrated in FIG. 5. At this time, as the first portion of the second link L2 of the second link part 533 moves in the first rectilinear direction X1, the second link part 533 of the second structure 530b may be unfolded with reference to the second link hinge LH2, and the first link part 531 of the second structure 530b may be unfolded with reference to the first link hinge LH1 according to the unfolding of the second link part 533 transferred through the link connection part 535.

The power transfer unit 555 may be disposed at the middle portion of the supporting plate 552, may rotatably support one portion of the first ball screw 553a and one portion of the second ball screw 554a, and may transfer a rotational power of the driving motor 556 to each of one portion of the first ball screw 553a and one portion of the second ball screw 554a. The power transfer unit 555 according to an embodiment of the present disclosure may include a rotation gear, a first pinion gear, and a second pinion gear. The power transfer unit 555 including the rotation gear and the first and second pinion gears may be referred to as a bevel gearbox including a gear and a pinion.

The rotation gear may be a bevel gear which rotates by the rotation of the driving motor 556. The first pinion gear may be fixed to one portion of the first ball screw 553a and may be disposed to engage with the rotation gear, and the first pinion gear may rotate according to rotation of the rotation gear to rotate the first ball screw 553a. The second pinion gear may be fixed to one portion of the second ball screw 554a and may be disposed to engage with the rotation gear, and the second pinion gear may rotate according to rotation of the rotation gear to rotate the second ball screw 554a.

Each of the rotation gear, the first pinion gear, and the second pinion gear according to an embodiment of the present disclosure may have a straight bevel gear structure, a spiral bevel gear structure, or a Zerol bevel gear structure, and for example, may have the spiral bevel gear structure for decreasing an undesired vibration or noise.

The driving motor 556 may be disposed on the power transfer unit 555 and may rotate the rotation gear of the power transfer unit 555 in response to a manipulation of the user (or the viewer).

The driving unit 550 according to an embodiment of the present disclosure includes a first limit switch 557a b disposed adjacent to one side (or one portion) of the power transfer unit 555, a third limit switch 557c disposed adjacent to the second link bracket 554c, and a fourth limit switch 557d disposed adjacent to the other side (or the other portion) of the power transfer unit 555.

The first limit switch 557a may output a first limit signal when contacting the first ball catch 553b which performs a rectilinear motion in the second rectilinear direction X2, and the second limit switch 557b may output a second limit signal when contacting the first ball catch 553b which performs a rectilinear motion in the first rectilinear direction X1. The third limit switch 557c may output a third limit signal when contacting the second ball catch 554b which performs a rectilinear motion in the first rectilinear direction X1, and the fourth limit switch 557d may output a fourth limit signal when contacting the second ball catch 554b which performs a rectilinear motion in the second rectilinear direction X2.

The driving unit 550 according to an embodiment of the present disclosure may further include a driving control circuit that controls driving of the driving motor 556 in response to a manipulation of a user (or a viewer) and stops the driving of the driving motor 556 in response to each of the first to fourth limit signals.

Figure 8:
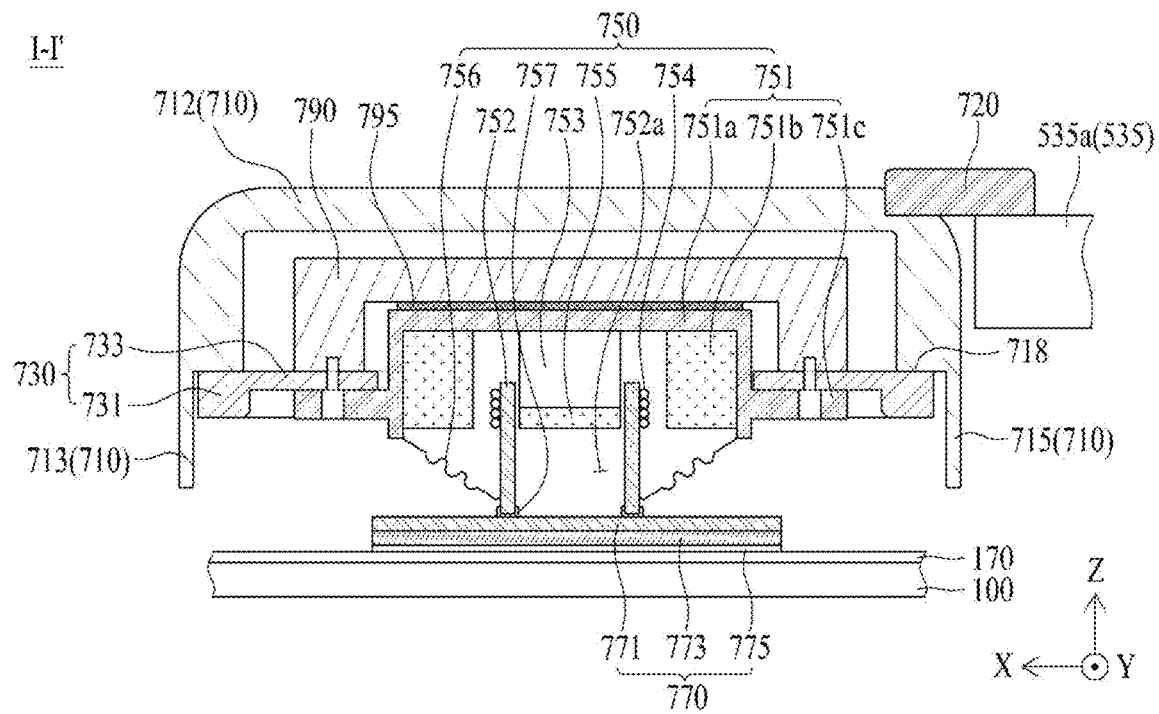
FIG. 8 is a cross-sectional view taken along line I-I' illustrated in FIG. 7.
Figure 9:
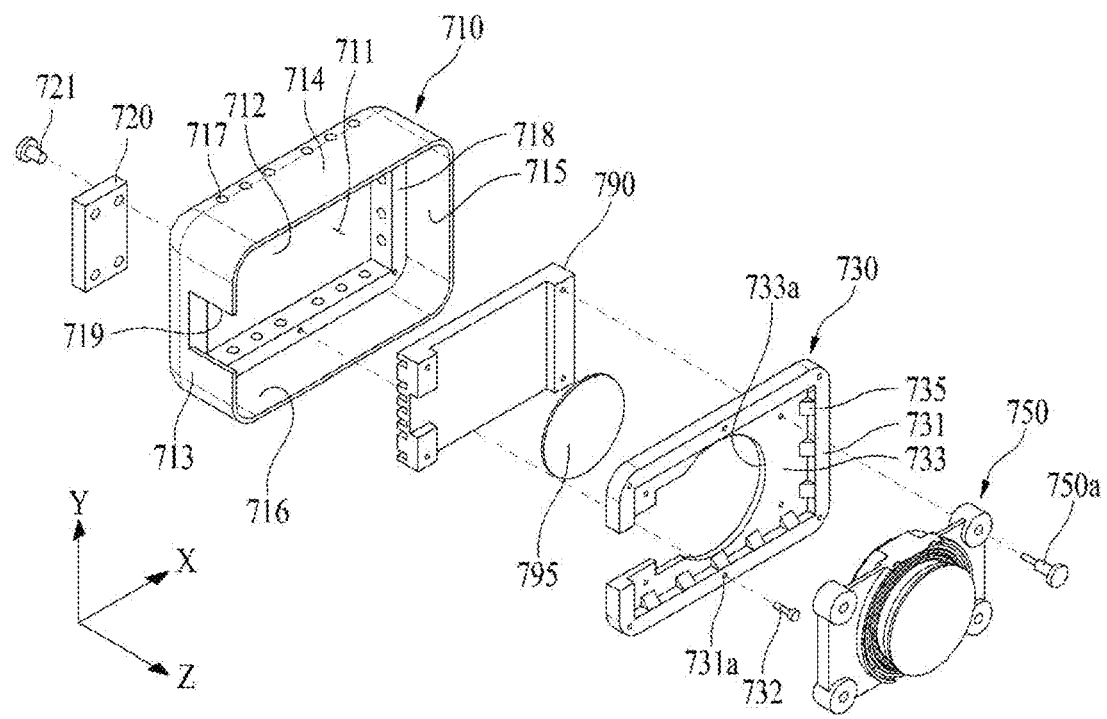
FIG. 9 is an exploded perspective view illustrating a vibration device illustrated in FIG. 8.
Figure 10:
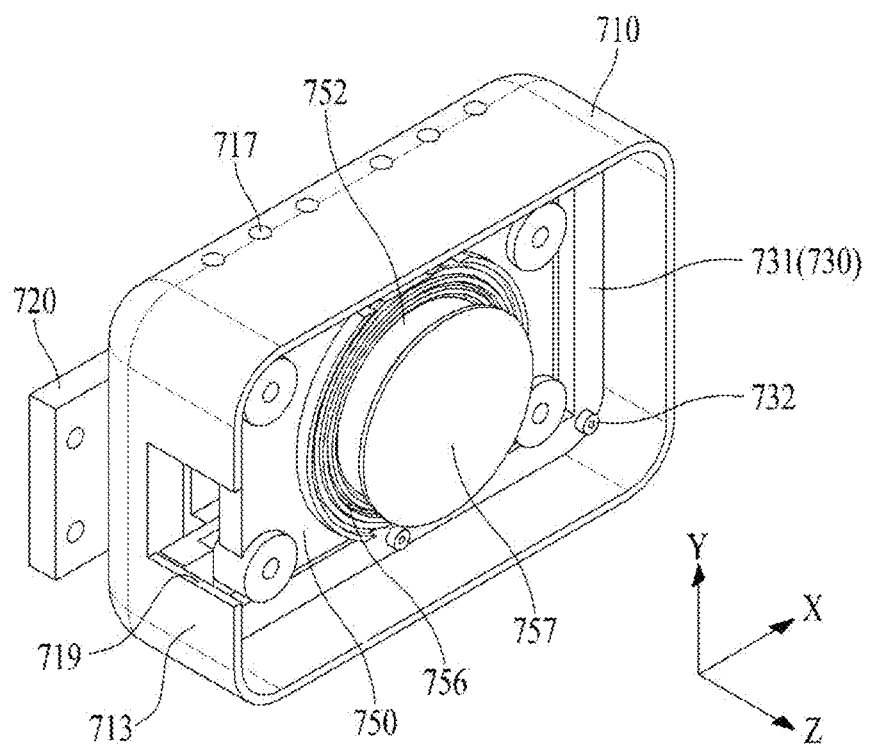
FIG. 10 illustrates a vibration device in a sound box illustrated in FIG. 9.

FIG. 8 is a cross-sectional view taken along line I-I' illustrated in FIG. 7. FIG. 9 is an exploded perspective view illustrating a vibration device illustrated in FIG. 8. FIG. 10 illustrates a vibration device in a sound box illustrated in FIG. 9. FIGS. 8 and 9 illustrate a vibration device according to an embodiment of the present disclosure.

With reference to FIGS. 5 to 10, the vibration device 700 according to an embodiment of the present disclosure may be disposed in or on the first and second structures 530a and 530b of the rolling module 500 and may vibrate the display panel 100, which is unwound from the roller part 350.

The vibration device 700 according to an embodiment of the present disclosure may include at least one vibration device 700-1, 700-2, 700-3, and 700-4.

The at least one vibration device 700-1, 700-2, 700-3, and 700-4 may include a vibration generator 750 configured to move according to a shape of a contact surface of the display panel 100. For example, the contact surface of the display panel 100 may be an area in directly contact with the vibration generator 750 in the area of the display panel 100.

The vibration generator 750 may be configured to move in an X-axis direction, a Y-axis direction, and a Z-axis direction according to the shape of the contact surface of the display panel 100. For example, the vibration generator 750 may be configured to rotate in an X-axis direction and a Y-axis direction, and move in a Z-axis direction according to a shape of the contact surface of the display panel 100.

The display panel 100 may be unfolded (or spread) in a completely flat state (or planar state), but may be unfolded (or spread) in a partially or entirely curved shape (or non-planar shape), rather than a completely flat state (or planar state) due to the flexible characteristics and the bending of the structures 530a and 530b, and the like. Thus, when the vibration generator 750 is disposed in a fixed state from the vibration devices 700-1, 700-2, 700-3, and 700-4 without any freedom of movement, vibration of the vibration generator 750 may not be transferred to the display panel 100 or may be weakly transferred according to the shape of the curved contact surface of the display panel 100, and thus, a desired sound may not be output due to a degradation of the amount of vibration of the display panel 100. Thus, the vibration generator 750 according to an embodiment of the present disclosure may be configured to move in the X-axis direction, the Y-axis direction, and the Z-axis direction according to the shape of the contact surface of the display panel 100, whereby the display panel 100 may be normally vibrated even when the display panel 100 is unfolded in a curved shape. For example, the X-axis direction may be a direction parallel to the first direction X, the Y-axis direction may be a direction parallel to the second direction Y, and the Z-axis direction may be a direction parallel to the thickness direction of the display panel 100.

The vibration device 700 according to an embodiment of the present disclosure may include first to fourth vibration devices 700-1, 700-2, 700-3, and 700-4.

The first vibration device 700-1 and the second vibration device 700-2 may be disposed in parallel with the first structure 530a of the rolling module 500 therebetween to directly vibrate a first rear region A1 of the display panel 100. For example, as seen from the rear surface of the display panel 100, the first rear region A1 of the display panel 100 may be a left region of the display panel 100 with respect to a long-side (or widthwise) center CL of the display panel 100.

The first and second vibration devices 700-1 and 700-2 may be disposed (or fixed) on the first structure 530a of the rolling module 500 to directly vibrate a first rear region A1 of the display panel 100. For example, the first vibration device 700-1 may directly vibrate an outer region OA of the first rear region A1 of the display panel 100, and the second vibration device 700-2 may directly vibrate an inner region IA of the first rear region A1 of the display panel 100. In this example, the outer region OA of the first rear region A1 may be a region between one side surface (or one short side) of the display panel 100 and the first structure 530a with respect to the display panel 100 where the whole display area is unfolded, and the inner region IA of the first rear region A1 may be a region between the long-side center CL of the display panel 100 and the first structure 530a.

One of the first vibration device 700-1 and the second vibration device 700-2 may be omitted. For example, considering a panel vibration characteristic based on an unfolded size of the display panel 100, the first vibration device 700-1, which moves in a rectilinear direction according to the second direction Y in the outer region OA of the first rear region A1 of the display panel 100 according to folding or unfolding of the first structure 530a, may be omitted instead of the second vibration device 700-2, which moves in a diagonal direction between the first direction X and the second direction Y in the inner region IA of the first rear region A1 of the display panel 100 according to folding or unfolding of the first structure 530a.

The third vibration device 700-3 and the fourth vibration device 700-4 may be disposed in parallel with the second structure 530b of the rolling module 500 therebetween to directly vibrate a second rear region A2 of the display panel 100. For example, as seen from the rear surface of the display panel 100, the second rear region A2 of the display panel 100 may be a right region of the display panel 100 with respect to the long-side (or widthwise) center CL of the display panel 100.

The third vibration device 700-3 and the fourth vibration device 700-4 may be disposed (or fixed) to the second structure 530b of the rolling module 500 to directly vibrate the second rear region A2 of the display panel 100. The third vibration device 700-3 may directly vibrate an outer region OA of the second rear region A2 of the display panel 100, and the fourth vibration device 700-4 may directly vibrate an inner region IA of the second rear region A2 of the display panel 100. In this case, the outer region OA of the second rear region A2 may be a region between the other side surface (or the other short side) of the display panel 100 and the second structure 530b with respect to the display panel 100 where the whole display area is unfolded, and the inner region IA of the second rear region A2 may be a region between the long-side center CL of the display panel 100 and the second structure 530b.

One of the third vibration device 700-3 and the fourth vibration device 700-4 may be omitted. For example, considering a panel vibration characteristic based on an unfolded size of the display panel 100, the third vibration device 700-3, which moves in the rectilinear direction according to the second direction Y in the outer region OA of the second rear region A2 of the display panel 100 according to folding or unfolding of the second structure 530b may be omitted instead of the fourth vibration device 700-4, which moves in the diagonal direction between the first direction X and the second direction Y in the inner region IA of the second rear region A2 of the display panel 100 according to folding or unfolding of the second structure 530b.

The first vibration device 700-1 according to an embodiment of the present disclosure may include a sound box 710, a movement member 730, a vibration generator 750, and a vibration member 770.

The sound box 710 may be connected to the link connection part 535 of the first structure 530a and may include a space 711. The space 711 may be a module receiving space or a module accommodating space, but the term is not limited thereto. The sound box 710 may have a box shape having a front opening facing the display panel 100, and may be formed of a plastic material or a metal material.

The sound box 710 according to an embodiment of the present disclosure may include a rear surface 712 and first to fourth side surfaces 713, 714, 715, and 716.

The rear surface 712 of the sound box 710 may be connected to the link connection part 535 of the first structure 530a. The rear surface 712 of the sound box 710, which is the outermost rear surface of the first vibration device 700-1, may mask sound (e.g., high-pitched sound) radiated in a direction toward the rear surface of the vibration generator 750 after being generated from the vibration generator 750.

The first to fourth side surfaces 713, 714, 715, and 716 of the sound box 710 may be connected to the periphery end portion of the rear surface 712 and may provide the front opening with the space 711 of the sound box 710 on the rear surface 712. At least one of the first to fourth side surfaces 713, 714, 715, and 716 may include at least one a first hole 717 allowing the space 711 to communicate with the outside therethrough. The first hole 717 may be a heat dissipating hole, but the term is not limited thereto.

The sound box 710 according to an embodiment of the present disclosure may further include an inner protruding portion 718 protruding between each of the first to fourth side surfaces 713, 714, 715, and 716 and the rear surface 712 to support the movement member 730.

The sound box 710 according to an embodiment of the present disclosure may further include a cable passing portion 719 formed on at least one of the rear surface 712 and the first to fourth side surfaces 713, 714, 715, and 716. For example, the cable passing portion 719 may be formed by removing a portion of the first side surface 714 facing the link connection part 535. The sound box 710 may be connected to the link connection part 535 of the first structure 530a by the module bracket 720.

The module bracket 720 may be disposed between the first joint member 535a in the link connection part 535 of the first structure 530a and the sound box 710 to fix the sound box 710 to the first joint member 535a. For example, one periphery portion of the module bracket 720 may be fixed to the outer periphery portion of the first joint member 535a by a plurality of screws 721. The other periphery portion of the module bracket 720 may be fixed to one periphery portion of the sound box 710 by the plurality of screws. Accordingly, the sound box 710 may be fixed to the module bracket 720 so as not to move along the first direction X and the third direction Z parallel to a thickness direction of the display panel 100, and may perform a rectilinear motion in the second direction Y together with the first joint member 535a of the link connection part 535 according to folding and unfolding of the first structure 530a.

The movement member 730 may be disposed in the space 711 of the sound box 710 and may movably support the vibration generator 750. A shape of the movement member 730 may be deformed according to movement of the vibration generator 750 based on a shape of the contact surface of the display panel 100. The movement member 730 according to an embodiment of the present disclosure may include a flexible material. The flexible material according to an embodiment of the present disclosure may have a Shore hardness of 40 or less with respect to the Shore A type. For example, the flexible material may include, but is not limited to, rubber, silicon or the like. The movement member 730 may suppress or reduce unnecessary vibration, other than sound vibration of the vibration generator 750, and unnecessary acoustic noise due to unnecessary vibration. For example, the movement member 730 may damp and absorb unnecessary vibration other than the sound vibration of the vibration generator 750 or maintain a state of equilibrium of the contact surface between the vibration generator 750 and the display panel 100, thereby suppressing occurrence of an unnecessary vibration mode of the vibration generator 750 to thus prevent or reduce chattering noise.

The movement member 730 according to an embodiment of the present disclosure may include a body frame 731 and a supporting portion 733, and the body frame 731 and the supporting portion 733 may be implemented as a single body formed of a soft material.

The body frame 731 may be inserted or accommodated and installed in the space 711 of the sound box 710. The body frame 731 according to an embodiment of the present disclosure may have a rectangular band shape having a size insertable or accommodable into the space 711 of the sound box 710, but is not limited thereto. The body frame 731 may be inserted or accommodated into the space 711 of the sound box 710 and may be coupled or connected to the inner protruding portion 718 of the sound box 710. For example, the body frame 731 may be coupled or fixed to the inner protruding portion 718 of the sound box 710 by a plurality of screws 732. The plurality of screws 732 may be fastened to the inner protruding portion 718 of the sound box 710, respectively, through the plurality of second holes 731a in the body frame 731 at certain intervals or distances. The second holes 731 may be screw holes, screw insertion holes, or screw accommodation holes, but the terms are not limited thereto.

The supporting portion 733 may extend from a lower portion of the inner surface of the body frame 731 toward a central portion thereof and movably support the vibration generator 750. For example, the supporting portion 733 may support only the rear periphery portion of the vibration generator 750.

Figure 11A:
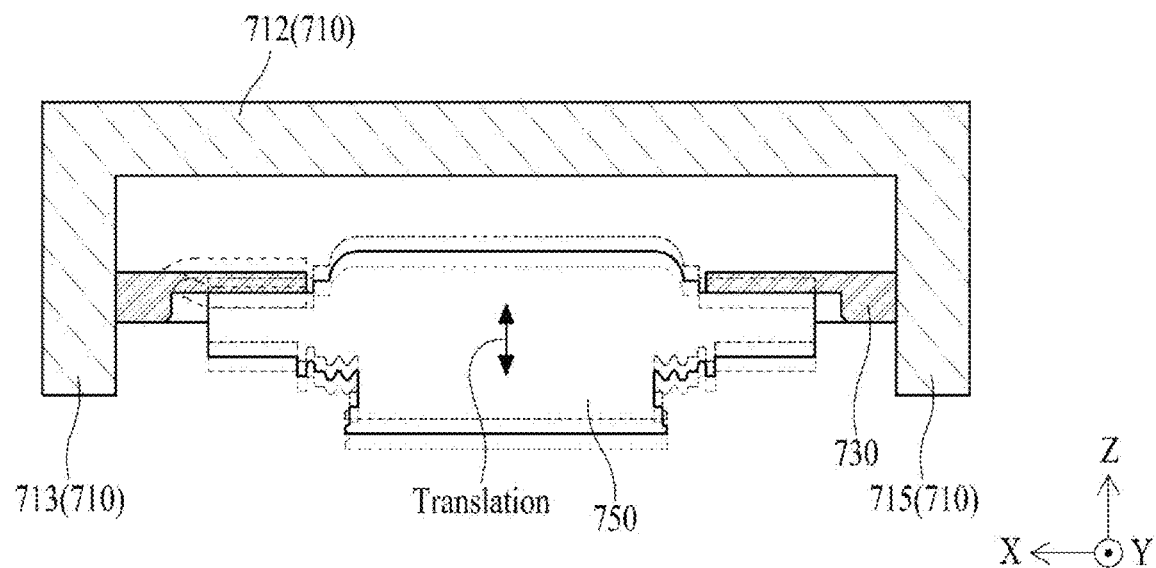
FIGS. 11A and 11B illustrate movement of a vibration generator illustrated in FIG. 10.
Figure 11B:
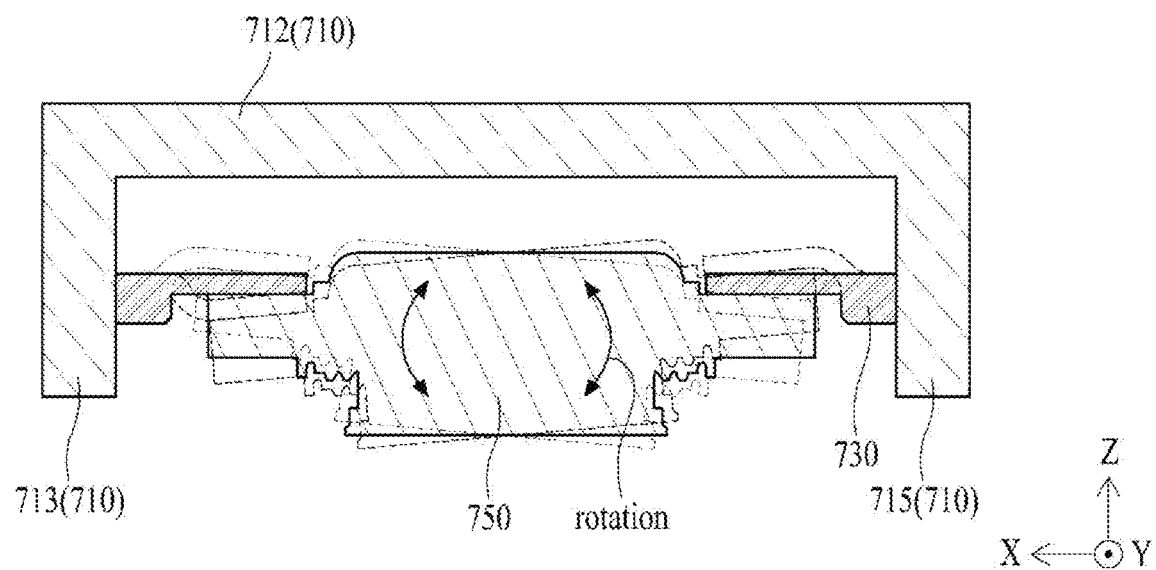

The supporting portion 733 according to an embodiment of the present disclosure may be relatively thinner than the body frame 731, and thus, a shape of the supporting portion 733 may be deformed according to movement of the vibration generator 750. For example, the supporting portion 733 may be moved or deformed in the X-axis direction, the Y-axis direction, and the Z-axis direction according to the movement of the vibration generator 750 in contact with the display panel 100. A supporting portion 733 not only enables translation of the vibration generator 750 with respect to the Z-axis direction as illustrated in FIG. 11A, but also enables rotation of the vibration generator 750 with respect to the X-axis direction and Y-axis direction as illustrated in FIG. 11B, thereby minimizing or reducing unnecessary translation of the vibration generator 750 in the X-axis direction and the Y-axis direction and unnecessary rotation of the vibration generator 750 in the Z-axis direction, and increasing contact between the vibration generator 750 and the display panel 100.

The supporting portion 733 according to an embodiment of the present disclosure may include an opening 733a overlapping the vibration generator 750. The opening 733a may have a circular shape or a polygonal shape and expose a rear surface of the vibration generator 750 toward the rear surface 712 of the sound box 710.

The supporting portion 733 according to an embodiment of the present disclosure may further include a plurality of supporting walls (or partition walls) 735 formed between the inner side surface of the body frame 731 and the supporting portion 733. The plurality of supporting walls 735 may restrict excessive movement (or deformation) of the body frame 731 by supporting the supporting portion 733 adjacent to the inner surface of the body frame 731.

Alternatively, a portion of each of the body frame 731 and the supporting portion 733 adjacent to the cable passing portion 719 of the sound box 710 may be removed. In this case, the movement member 730 may have a "⊃" shape, in which one side is open two-dimensionally.

The vibration generator 750 may be disposed on the movement member 730 and may vibrate the display panel 100, which is unfolded. The vibration generator 750 may be implemented to have a size insertable or accommodable into the space 711 of the sound box 710 and may be on the movement member 730 in the space 711 of the sound box 710. The vibration generator 750 may slide in contact with the rear surface of the back cover 170 on the rear surface of the display panel 100 according to folding or unfolding of the structures 530a and 530b. When the display panel 100 is unfolded (or spread) according to the unfolding of the structures 530a and 530b, the vibration generator 750 may be vibrated according to a sound signal supplied from an external sound amplifier to vibrate the display panel 100 so that a panel vibration sound is generated by the vibration of the unfolded display panel and is output to the forward region of the unfolded display panel 100. Also, because the vibration generator 750 may be moved by the supporting portion 733 of the movement member 730, the vibration generator 750 may be rotated in or around the X-axis direction and the Y-axis direction as illustrated in FIG. 11B, as well as making a translational motion in the Z-axis direction as illustrated in FIG. 11A, according to a shape of the contact surface of the display panel 100. Thus, contact with the display panel 100 may be increased and the display panel 100 may be vibrated according to the sound signal and/or the vibration of the vibration generator 750. That is, a contact area between the display panel 100 and the vibration generator 750 may be increased.

The vibration generator 750 according to an embodiment of the present disclosure includes a module frame 751, a bobbin 752, a magnet 753, a coil 754, a center pole 755, and a damper 756. The vibration generating unit 750 having such a configuration may be referred to as a sound actuator or a sound exciter.

The module frame 751 according to an embodiment of the present disclosure may include a module body 751a, an upper plate 751b, and a bracket 751c.

The module body 751a may be inserted or accommodated into an opening 733a in the supporting portion 733 of the movement member 730. The module body 751a according to an embodiment of the present disclosure may include a cylindrical shape having a front opening. The module body 751a may be a lower plate supporting a magnet 753.

The upper plate 751b may be inserted or accommodated into the module body 751 to have a cylindrical shape including a hollow portion. The upper plate 751b and the module body 751a may be formed as one body and the module body 751a are not limited to the term, and may be expressed using another term such as "yoke."

The bracket 751c may protrude from each of one portion and the other portion of the module body 751a. The bracket 751c may be fixed (or coupled) to the supporting portion 733 of the movement member 730 by a plurality of module fixing members 750a. Each of the plurality of module fixing members 750a may be a screw or a bolt fastened to the supporting portion 733 of the movement member 730 through the bracket 750c.

Because the module frame 751 may be fixed to the supporting portion 733 of the movement member 730, the module frame 751 may be moved or deformed in the X axis direction, the Y axis direction, and the Z axis direction by movement of the supporting portion 733.

The bobbin 752 may be on the module frame 751 and may vibrate the unfolded display panel 100. The bobbin 752 according to an embodiment of the present disclosure may be formed in a cylindrical structure including a hollow portion 752a and may be in contact with the rear surface of the unfolded display panel 100 or the rear surface of the back cover 170. For example, the bobbin 752 may be implemented as a ring-shaped (or cylindrical) structure which is formed of a material produced by processing pulp or paper, Al or Mg or an alloy thereof, synthetic resin such as polypropylene, or polyamide-based fiber. The bobbin 752 may perform a vertical reciprocating vibration (or forward and backward reciprocating vibration) in the Z-axis direction by a magnetic force. For example, the bobbin 752 may vibrate in a first vibration direction Z1 directed toward the forward region FD of the unfolded display panel 100 and a second vibration direction Z2 directed toward a direction opposite to the first vibration direction Z1.

The magnet 753 may be on the module frame 751 so as to be accommodated in the hollow portion 752a of the bobbin 752. The magnet 753 may be a permanent magnet having a cylindrical shape so as to be inserted or accommodated into the hollow portion 752a of the bobbin 752. The magnet 753 according to an embodiment of the present disclosure may be implemented with a sintered magnet such as barium ferrite, and a material of the magnet 753 may be formed of ferric oxide ($Fe_2O_3$), barium carbonate ($BaCO_3$), neodymium magnet, strontium ferrite with an improved magnetic component, an alloy cast magnet including Al, nickel (Ni), and cobalt (Co), and/or the like, but is not limited thereto. For example, the neodymium magnet may be neodymium-iron-boron (Nd—Fe—B), but is not limited thereto.

The coil 754 may be wound to surround the lower outer circumference surface of the bobbin 752 and may be supplied with a sound signal (or voice signal) from the outside. The coil 754 may move upward and downward along with the bobbin 752. In this case, the coil 754 may be referred to as a voice coil or the like. When a sound signal (or a current) is applied to the coil 754, a whole portion of the bobbin 752 may vibrate (for example, perform a vertical reciprocating motion) according to Fleming's Left-Hand Rule for Motors based on an application magnetic field generated around the coil 754 and an external magnetic field generated around the magnet 753.

The center pole 755 may be on the magnet 753 and may guide the vibration of the bobbin 752. For example, the center pole 755 may be inserted or accommodated into the hollow portion 752a of the bobbin 752 having a cylindrical shape and may be surrounded by the bobbin 752. For example, the center pole 755 may be referred to as an "elevating guider," "pole pieces," or the like.

The damper 756 may be between the module frame 751 and the bobbin 752. The damper 756 according to an embodiment of the present disclosure may be between the module body 751a of the module frame 751 and the upper circumference surface of the bobbin 752. The damper 756 may have a structure which is creased between one portion and the other portion thereof, and may be contracted and relaxed based on a vibration of the bobbin 752 to control the vibration of the bobbin 752. The damper 756 may limit a vibration distance (or a vertical movement distance) of the bobbin 752 through a restoring force. For example, when the bobbin 752 moves by a certain distance or more or vibrates by a certain distance or less, the bobbin 752 may be restored to an original position with the restoring force of the damper 756. The damper 756 may be represented by other terms such as a "spider," "suspension," or an "edge."

The vibration generator 750 according to an embodiment of the present disclosure may further include a bobbin protection member 757.

The bobbin protection member 757 may be coupled or connected to an upper portion of the bobbin 752. The bobbin protection member 757 according to an embodiment of the present disclosure may include a cylindrical structure having an opening overlapping the hollow portion 752*a* of the bobbin 752 or a plate type structure covering the hollow portion 752*a* of the bobbin 752. The bobbin protection member 757 may cover the upper surface of the bobbin 752 to protect the bobbin 752, thereby preventing the bobbin 752 from being deformed by an external impact. For example, the bobbin protection member 757 may be include fiber reinforced plastics, composite resin including fiber reinforced plastics, or metal, and in this case, may perform a heat dissipation function of dissipating heat which occurs when the vibration generator 750 is driven. The fiber reinforced plastics may be one of carbon fiber reinforced plastics (CFRP), glass fiber reinforced plastics (GFRP), graphite fiber reinforced plastics (GFRP), or a combination thereof, but the present embodiment is not limited thereto.

The bobbin protection member 757 according to an embodiment of the present disclosure may be coupled or connected with the upper portion of the bobbin 752 by a double-sided tape or adhesive resin. Here, the adhesive resin may be an epoxy resin or an acryl resin, but is not limited thereto.

The bobbin protection member 757 according to another embodiment of the present disclosure may include a bobbin recess into which the upper portion of the bobbin 752 is inserted or accommodated. In this case, the bobbin 752 may be inserted or accommodated into the bobbin recess in an interference fit manner so as to be combined with the bobbin protection member 757 without a double-sided tape or adhesive resin.

As described above, the vibration generator 750 according to an embodiment of the present disclosure may be implemented as an internal magnet type where the magnet 753 is inserted or accommodated into the hollow portion 752*a* of the bobbin 752.

Alternatively, the vibration generator 750 according to an embodiment of the present disclosure may be implemented as an external magnet type (or a dynamic type) where the magnet 753 is disposed to surround an outside of the bobbin 752. The external magnet type vibration generator 750 is the same as the internal magnet type, except that the magnet 753 is provided between the module body 751*a* and the upper plate 751*b* and the center pole 755 is provided on the module body 751*a* so as to be inserted or accommodated into the hollow portion 752*a* of the bobbin 752, and thus, its detailed description is omitted.

The vibration member 770 may be coupled or connected to the vibration generator 750. For example, the vibration member 770 may be coupled or connected to the bobbin 752 (or the bobbin protection member) of the vibration generator 750 and contact the unfolded display panel 100. The vibration member 770 may vibrate according to the vibration of the bobbin 752 to transfer the vibration of the bobbin 752 to the unfolded display panel 100. The vibration member 770 may be a vibration transfer member.

The vibration member 770 according to an embodiment of the present disclosure may include a vibration plate 771 and a magnetic plate 773.

The vibration plate 771 may be coupled or connected to the upper portion of the bobbin 752 or may be coupled or connected to the bobbin protection member 757 to cover the hollow portion 752*a* of the bobbin 752. The vibration plate 771 may have a smaller size than the sound box 710 so as to be able to access (or enter and exit) the front opening of the sound box 710 according to the vibration of the bobbin 752. The vibration plate 771 according to an embodiment of the present disclosure may be formed of any one of a metal material such as an Al material, a Mg material, an Al alloy material, a Mg alloy material, and a Mg—Li alloy material. The vibration plate 771 transfers the vibration of the bobbin 752 to the display panel 100 and may dissipate heat generated from the coil 754 and the like. The vibration plate 771 may be a vibration transfer plate.

The magnetic plate 773 may be on the front surface of the vibration plate 771. For example, the magnetic plate 773 may be coupled to (or adhered to) the front surface of the vibration plate 771 by an adhesive member (for example, double-sided tape or adhesive). The magnetic plate 773 may be coupled (or adhered) to the back cover 170 of the display panel 100 so as to transfer the vibration of the vibration generator 750 to the rear surface of the unfolded display panel 100. Even if the magnetic plate 773 may be coupled to (or adhered to) the back cover 170 of the display panel 100, the magnetic plate 773 may move or slide according to the folding or unfolding of the display panel 100, and thus, the magnetic plate 773 may be applied to the rollable display panel.

The magnetic plate 773 according to an embodiment of the present disclosure may be a neodymium magnet having a relatively strong magnetic force (or ferromagnetism). For example, the neodymium magnet may be neodymium-iron-boron (Nd—Fe—B), but is not limited thereto.

The magnetic plate 773 according to another embodiment of the present disclosure may be formed of ferric oxide ($Fe_2O_3$), barium carbonate ($BaCO_3$), neodymium magnet, strontium ferrite with an improved magnetic component, an alloy cast magnet including Al, nickel (Ni), and cobalt (Co), and/or the like, but is not limited thereto and may use a permanent magnet having a magnetic force.

The vibration member 770 according to an embodiment of the present disclosure may further include a coating layer 775 on a contact surface of the magnetic plate 773 in contact with the display panel 100.

The coating layer 775 may be on the front surface (or panel contact surface) of the magnetic plate 773 in directly contact with the rear surface of the display panel 100, and may reduce frictional force between the back cover 170 and the magnetic plate 773. For example, if the frictional force between the back cover 170 and the magnetic plate 773 is relatively high, scratches or the like may be generated on the rear surface of the back cover 170 or friction noise may be generated. To prevent such a problem, the coating layer 775 may be formed of a material having a relatively low friction coefficient, and may be coated on the entire surface of the magnetic plate 773 to have a constant thickness, thereby reducing the frictional force between the back cover 170 and the magnetic plate 773.

The coating layer 775 may be formed of a material having a friction coefficient of 0.05 to 0.5. The coating layer 775 may be a self-lubricative material, but is not limited thereto.

The self-lubricative material may be any one of PTFE (polytetrafluoroethylene) having a friction coefficient of 0.05 to 0.1, PI (polyimide) having a friction coefficient of 0.2 to 0.5, PBI (polybenzimidazole) having a friction coefficient of 0.24, PAI (polyamide imide) having a friction coefficient of 0.25 to 0.45, PEEK (polyetherether ketone) having a coefficient of friction of 0.3 to 0.5, and PEI (polyetherimide) having a friction coefficient of 0.42, but is not limited thereto. For example, the coating layer 775 may include a PTFE material having a relatively low friction coefficient.

The first vibration device 700-1 according to an embodiment of the present disclosure may further include a heat sink 790.

The heat sink 790 may be supported on the supporting portion 733 of the movement member 730 so as to overlap the vibration generator 750, and may be connected to the rear surface of the vibration generator 750. The heat sink 790 may be supported on the supporting portion 733 by a plurality of module fixing members 750a for coupling or connecting the vibration generator 750 to the supporting portion 733. In this case, each of the plurality of module fixing members 750a may be fastened to the heat sink 790 through the bracket 751c of the vibration generator 750 and the supporting portion 733, thereby coupling or connecting the vibration generator 750 to the front surface of the supporting portion 733 and coupling or connecting the heat sink 790 to the rear surface of the supporting portion 733. A heat sink 790 may rapidly dissipate heat generated in the vibration generator 750.

The heat sink 790 may be moved according to the movement of the supporting portion 733 in a space between the rear surface 712 of the sound box 710 and the movement member 730, and thus act as a balance mass of the vibration generator 750. The heat sink 790 may suppress or reduce a rigid vibration mode of the vibration generator 750 by acting as a weight (or mass) for the vibration generator 750, and may omit (or eliminate) a separate center mass for maintaining balance of the center portion of the vibration generator 750.

The first vibration device 700-1 according to an embodiment of the present disclosure may further include an adhesive member 795 between the heat sink 790 and the vibration generator 750. The adhesive member 795 may be coupled to (or attached to) the heat sink 790 and may be coupled to (or attached to) the rear surface of the vibration generator 750 through the opening 733a of the movement member 730. Thus, the adhesive member 795 may connect the heat sink 790 and the rear surface of the vibration generator 750 through the opening 733a of the movement member 730. The adhesive member 795 transfers heat of the vibration generator 750 to the heat sink 790 so that heat generated in the vibration generator 750 is dissipated through the heat sink 790. The adhesive member 795 may be a heat transfer adhesive member, but the term is not limited thereto.

The adhesive member 795 according to an embodiment of the present disclosure may include a first adhesive layer coupled to (or attached to) the heat sink 790, a second adhesive layer coupled to (or attached to) the rear surface of the vibration generator 750, and a layer, for example, a heat transfer layer, between the first adhesive layer and the second adhesive layer.

The second vibration device 700-2 according to an embodiment of the present disclosure has substantially the same configuration as that of the first vibration device 700-1, except that the second vibration device 700-2 is disposed on the second joint member 535b of the first structure 530a and directly vibrates the inner region IA of the first rear region A1 of the display panel 100. Thus, like reference numerals refer to like elements and repetitive descriptions are omitted.

The third vibration device 700-3 according to an embodiment of the present disclosure has substantially the same configuration as that of the first vibration device 700-1, except that the third vibration device 700-3 is disposed on the first joint member 535a of the second structure 530b and directly vibrates the outer region OA of the second rear region A2 of the display panel 100. Thus, like reference numerals refer to like elements and repetitive descriptions are omitted.

The fourth vibration device 700-4 according to an embodiment of the present disclosure has substantially the same configuration as that of the first vibration device 700-1, except that the fourth vibration device 700-4 is disposed on the second joint member 535b of the second structure 530b and directly vibrates the inner region IA of the second rear region A2 of the display panel 100. Thus, like reference numerals refer to like elements and repetitive descriptions are omitted.

The vibration device 700 according to an embodiment of the present disclosure may vibrate the unfolded display panel 100 using the vibration generator 750 configured as a voice coil type actuator having a relatively good low-pitched sound output characteristic, thereby enhancing a low-pitched sound characteristic of a panel vibration sound of the display panel 100.

Also, in the vibration device 700 according to an embodiment of the present disclosure, because the remaining portion excluding the front surface of the vibration generator 750 facing the display panel 100 is surrounded by the sound box 710, sound (for example, high-pitched sound) radiated in the direction toward the rear surface of the vibration generator 750 may be masked (or removed) to improve sound quality output to the front of the display panel 100.

Figure 12:
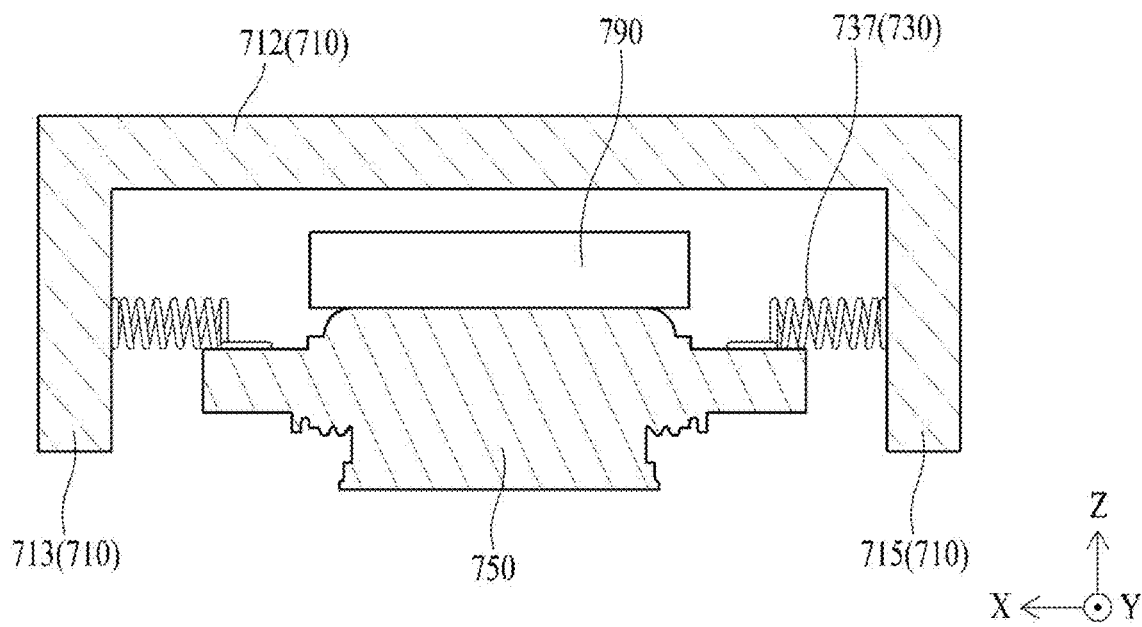
FIG. 12 illustrates a movement member according to another embodiment of the present disclosure.

FIG. 12 illustrates a movement member according to another embodiment of the present disclosure, which is configured by modifying the movement member in the vibration device of the display apparatus illustrated in FIGS. 1 to 10. In the following description, therefore, repetitive descriptions of elements other than the movement member and relevant elements are omitted.

With reference to FIG. 12, a movement member 730 according to another embodiment of the present disclosure may include a plurality of elastic members 737 connected between a periphery of the vibration generator 750 and a side portion of the sound box 710.

One portion of each of the plurality of elastic members 737 may be fixed to each of the first to fourth side surfaces 713, 714, 715, and 716 of the sound box 710, and the other portion of each of the plurality of elastic members 737 may be fixed to the bracket 751c of the vibration generator 750. In an embodiment, the other portion of each of the plurality of elastic members 737 may be fixed to the bracket 751c by the plurality of module fixing members 750a. As another embodiment, the other portion of each of the plurality of elastic members 737 may be fixed between the bracket 751c and the heat sink 790 by the plurality of module fixing members 750a.

Similar to the supporting portion 733 formed of a soft material as illustrated in FIGS. 11A and 11B, each of the plurality of elastic members 737 as described above allows a translation motion of the vibration generator 750 in the Z-axis direction and allows rotation of the vibration generator 750, thereby minimizing or reducing unnecessary translation of the vibration generator 750 in the X-axis direction and the Y-axis direction and unnecessary rotation of the vibration generator 750 in the Z-axis direction, and increasing contact between the vibration generator 750 and the display panel 100.

When the other portion of each of the plurality of elastic members 737 is fixed to the bracket 751*c* by the plurality of module fixing members 750*a*, the heat sink 790 may be formed to have a smaller size than the module body 751*a*, and may be coupled to (or attached to) the rear surface of the vibration generator 750 by the adhesive member 795.

Figure 13:
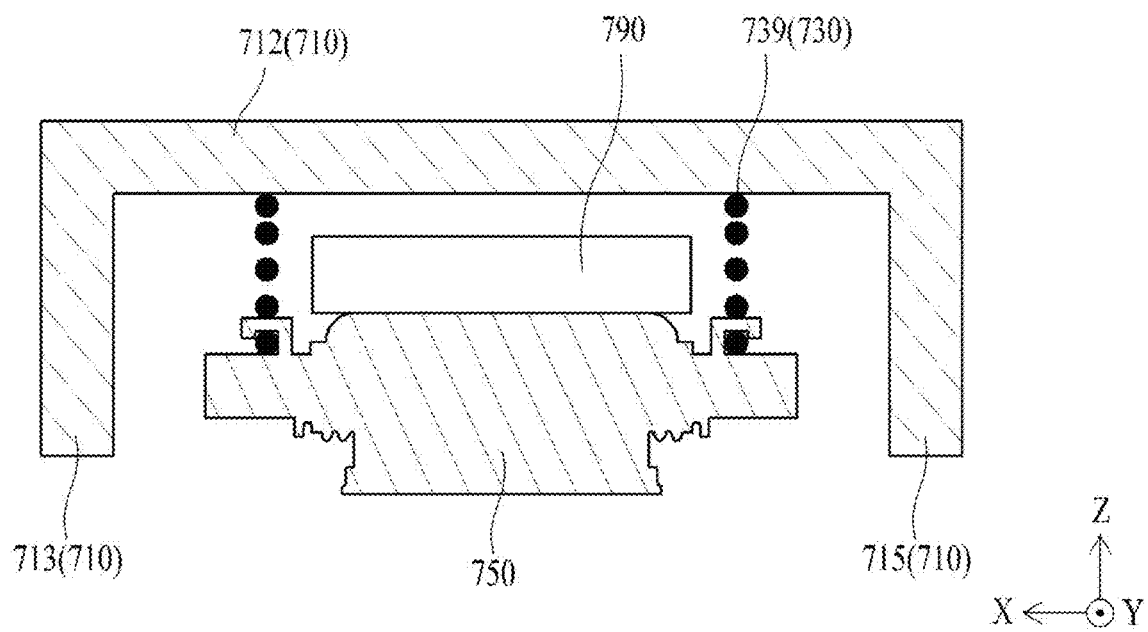
FIG. 13 illustrates a movement member according to another embodiment of the present disclosure.

FIG. 13 illustrates a movement member according to another embodiment of the present disclosure, which is configured by modifying the movement member in the vibration device of the display apparatus illustrated in FIGS. 1 to 10. In the following description, therefore, repetitive descriptions of elements other than the movement member and relevant elements are omitted.

With reference to FIG. 13, the movement member 730 according to another embodiment of the present disclosure may include at least one spring 739 connected between a periphery of the vibration generator 750 and the rear surface 712 of the sound box 710.

The at least one spring 739 may be formed to have a larger size than the module body 751*a* of the vibration generator 750. One portion of the at least one spring 739 may be fixed to the rear surface 712 of the sound box 710 and the other portion of the at least one spring 739 may be fixed to the bracket 751*c* of the vibration generator 750. For example, the heat sink 790 may be formed to have a size insertable or accommodable into the spring 739 and may be coupled to (or attached to) the rear surface of the vibration generator 750 by the adhesive member 795. The spring 739 may be an elastic spring, but term is not limited thereto.

One portion of each of the plurality of elastic springs 739 may be fixed to the rear surface 712 of the sound box 710 and the other portion of each of the plurality of springs 739 may be fixed to the bracket 751*c* of the vibration generator 750. For example, the other portion of each of the plurality of elastic springs 739 may be fixed to the bracket 751*c* by the plurality of module fixing members 750*a*. In this case, the heat sink 790 may be formed to have a size insertable or accommodable into a space between the plurality of springs 739 and may be coupled to (or attached to) the rear surface of the vibration generator 750 by the adhesive member 795.

The at least one spring 739 may be formed of the soft material illustrated in FIGS. 11A and 11B in the same manner as the supporting portion 733, and translation motion of the vibration generator 750 in the Z-axis direction and rotation of the vibration generator 750 with respect to the X-axis direction and the Y-axis direction are enabled, thereby minimizing or reducing unnecessary translation in the X-axis direction and the Y-axis direction of the vibration generator 750 and unnecessary rotation in the Z-axis direction, and so that the contact between the vibration generator 750 and the display panel 100 may be increased.

Similar to the supporting portion 733 formed of a soft material as illustrated in FIGS. 11A and 11B, the at least one spring 739 allows a translation motion of the vibration generator 750 in the Z-axis direction and allows rotation of the vibration generator 750 with respect to the X-axis direction and the Y-axis direction, thereby minimizing or reducing unnecessary translation of the vibration generator 750 in the X-axis direction and the Y-axis direction and unnecessary rotation of the vibration generator 750 in the Z-axis direction and increasing contact between the vibration generator 750 and the display panel 100.

Figure 14:
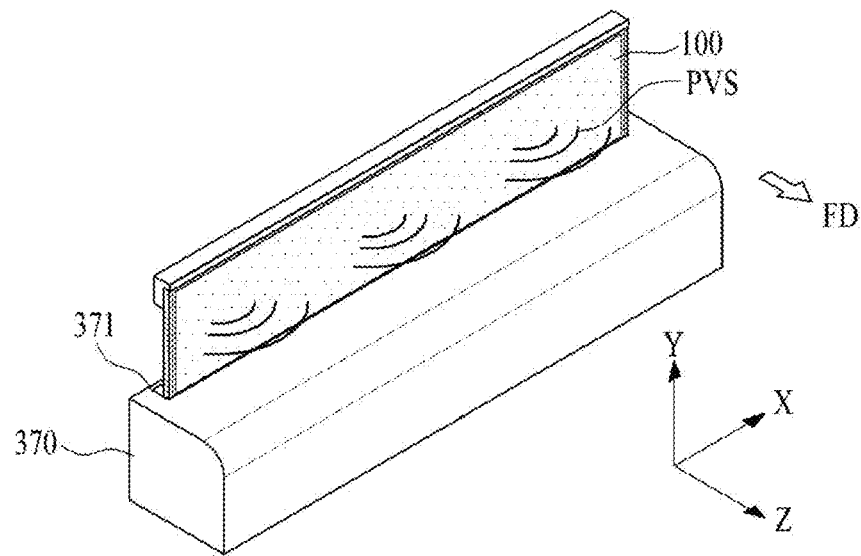
FIG. 14 illustrates sound output in a local display mode of a display apparatus according to an embodiment of the present disclosure.
Figure 15:
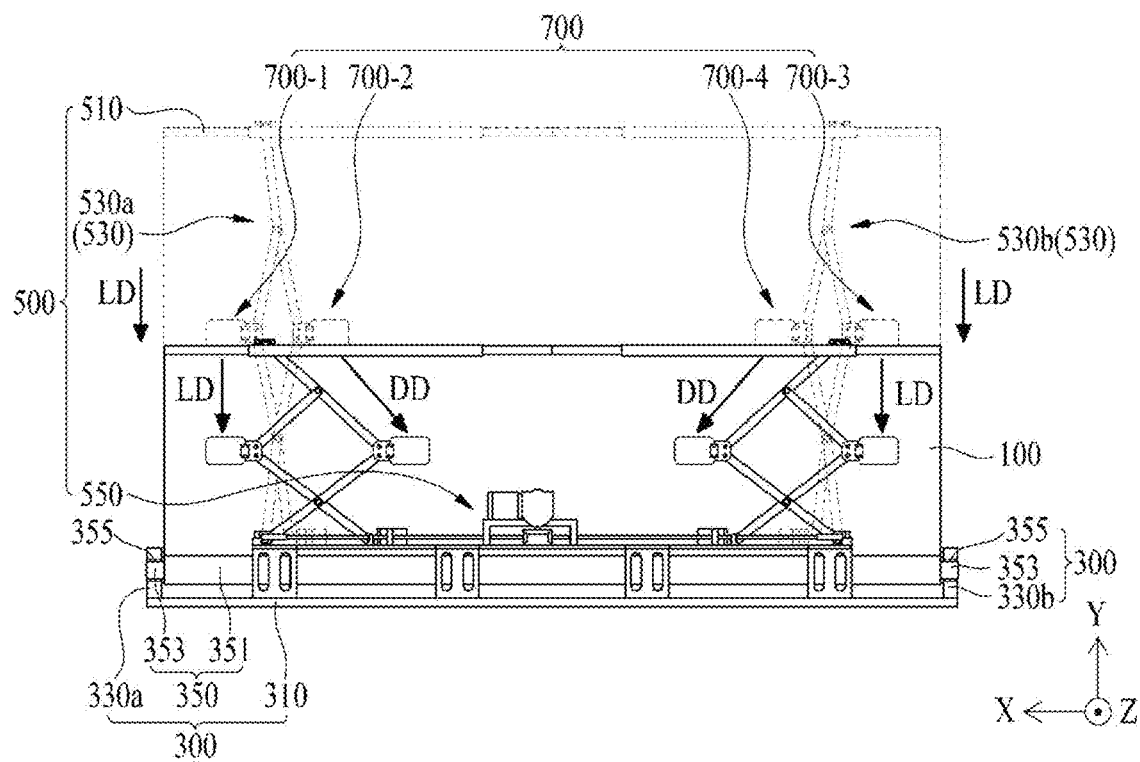
FIG. 15 illustrates a rolling module and a vibration device in a local display mode of the display apparatus illustrated in FIG. 14.

FIG. 14 illustrates sound output in a local display mode of a display apparatus according to an embodiment of the present disclosure. FIG. 15 illustrates a rolling module and a vibration device in the local display mode of the display apparatus illustrated in FIG. 14.

With reference to FIGS. 14 and 15, the display apparatus according to an embodiment of the present disclosure may operate in the local display mode (or a partial display mode or a local screen mode), based on a selection of a user (or a viewer). For example, the display apparatus according to an embodiment of the present disclosure may unfold the display area of the display panel 100 in proportion to a degree of direct control (or adjustment) by the user (or the viewer), or may unfold only the display area of the display panel 100 adjusted based on the local display mode selected by the user (or the viewer). Also, the vibration device 700 may move along with folding or unfolding of the structures 530*a* and 530*b* of the rolling module 500 to vibrate the display panel 100 unfolded by the local display mode. For example, each of the first and third vibration devices 700-1 and 700-3 of the vibration device 700 may move in the rectilinear direction LD according to the second direction Y when the structures 530*a* and 530*b* are folded or unfolded, and each of the second and fourth vibration devices 700-2 and 700-4 of the vibration device 700 may move to a center portion of the display panel 100 according to the diagonal direction DD between the first direction X and the second direction Y when the structures 530*a* and 530*b* are folded or unfolded.

In the display apparatus according to an embodiment of the present disclosure, because the vibration device 700 moves along with folding or unfolding of the structures 530*a* and 530*b* of the rolling module 500, the display apparatus according to an embodiment of the present disclosure may output a panel vibration sound, generated by a vibration of the display panel 100, to a forward region FD in front of the display panel 100 in a full screen mode (or a full display mode) illustrated in FIG. 1 or the local screen mode illustrated in FIG. 14.

Figure 16:
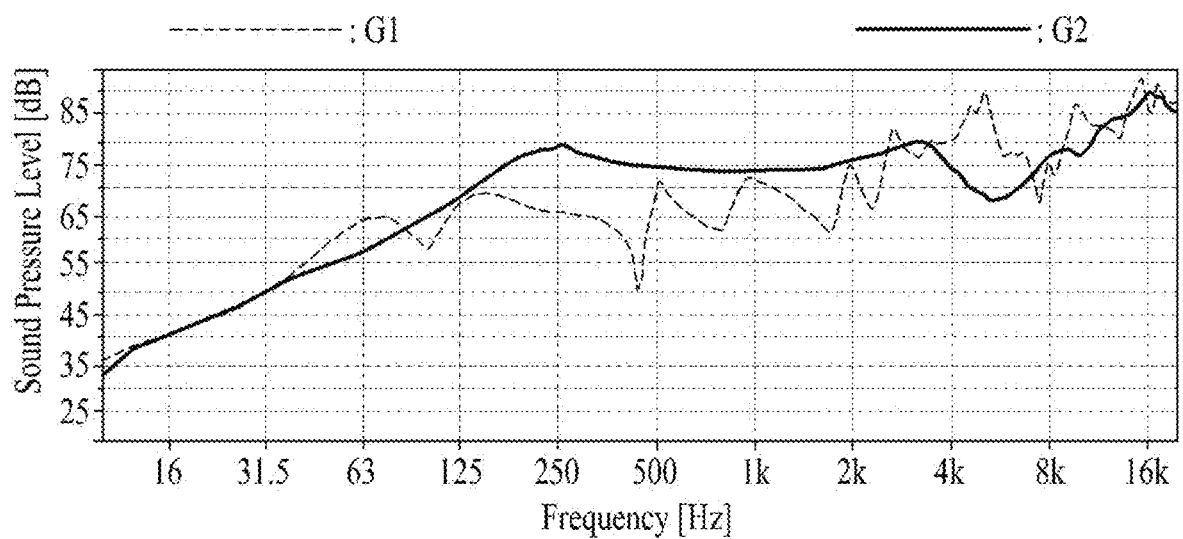
FIG. 16 is a graph showing sound output characteristics of the display apparatuses according to a comparative example and an embodiment of the present disclosure.

FIG. 16 is a graph showing a sound output characteristic of a display apparatus according to a comparative example and a sound output characteristic of a display apparatus according to an embodiment of the present disclosure. The dotted-line graph G1 according to the comparative example illustrated in FIG. 16 shows a sound output characteristic of the display panel according to the vibration of the vibration generator, which does not move according to a shape of a contact surface of the display panel, and the solid-line graph G2 according to an embodiment of the present disclosure illustrated in FIG. 16 shows a sound output characteristic of the display panel according to the vibration of the vibration generator that moves according to a shape of a contact surface of the display panel. In FIG. 16, the abscissa axis (x-axis) represents a frequency in hertz (Hz), and the ordinate axis (y-axis) represents a sound pressure level in decibel (dB). Here, the sound output characteristics have been measured using sound analysis equipment.

As shown in FIG. 16, in comparison with a display apparatus according to the comparative example, it may be shown that a display apparatus according to an embodiment of the present disclosure has improved (or enhanced) sound pressure level and uniform sound pressure level at a frequency band of about 10 Hz to about 16 kHz, and thus, outputting a sound without noise and smooth sound.

In particular, in the case of the display apparatus according to the comparative example, an original sound may be distorted or sound pressure characteristics and sound quality characteristics may be degraded due to an excessively low sound pressure level at a frequency band of about 100 Hz, about 400 Hz, about 800 Hz, and about 1.8 kHz of a frequency band between 63 Hz to 2 kHz. In contrast, the display apparatus according to an embodiment of the present disclosure may have uniform sound pressure level at the frequency band of 63 Hz to 2 kHz, and thus, original sound is not distorted and the sound pressure characteristics and sound quality characteristics may be improved.

A display apparatus according to an embodiment of the present disclosure will be described as follows.

According to an embodiment of the present disclosure, a display apparatus may include a display panel including a plurality of pixels and configured to display an image; a roller on which the display panel is wound or unwound; a rolling module including a structure connected to an upper portion of the display panel and configured to wind or unwind the display panel according to a folding or unfolding of the structure; and a vibration device at the structure, the vibration device configured to vibrate the display panel when unwound from the roller, wherein the vibration device includes a vibration generator that contacts a contact surface of the display panel and is configured to move to maintain the contact with the contact surface.

According to some embodiments of the present disclosure, the display apparatus further includes a housing module including the roller.

According to some embodiments of the present disclosure, the vibration generator is configured to rotate around a first direction, a second direction, and/or a third direction, and/or is configured to move along the first direction, the second direction, and/or the third direction according to a shape of the contact surface of the display panel.

According to some embodiments of the present disclosure, the display apparatus further includes the rolling module further including a driving unit configured to fold or unfold the structure; and the structure further including a first link part including a first portion connected to the upper portion of the display panel; a second link part including a first portion connected to the driving unit; and a link connection part rotatably connected to each of a second portion of the first link part and a second portion of the second link part, wherein the vibration device is at the link connection part.

According to some embodiments of the present disclosure, the vibration device further includes a sound box connected to the link connection part and including a space; and a movement member in the space and flexibly supporting the vibration generator, wherein the movement member is deformed according to movement of the vibration generator based on a shape of the contact surface of the display panel.

According to some embodiments of the present disclosure, the movement member further includes a flexible material.

According to some embodiments of the present disclosure, the movement member includes a body frame connected to the sound box; and a supporting portion extending from an inner surface of the body frame and flexibly supporting the vibration generator.

According to some embodiments of the present disclosure, the vibration device further includes a heat sink connected to a rear surface of the vibration generator.

According to some embodiments of the present disclosure, the heat sink may be configured to move according to a movement of the supporting portion in a space between a rear surface of the sound box and the movement member.

According to some embodiments of the present disclosure, the supporting portion includes an opening overlapping the vibration generator; and the vibration device further includes an adhesive member adhering the heat sink to the vibration generator.

According to some embodiments of the present disclosure, the movement member includes a plurality of elastic members connected between the vibration generator and the sound box.

According to some embodiments of the present disclosure, the vibration device further includes a heat sink on a rear surface of the vibration generator.

According to some embodiments of the present disclosure, the vibration generator includes a module frame supported by a movement member in the vibration device; a bobbin in the module frame; a magnet inside or outside the bobbin; a coil wound around the bobbin; and a vibration member connected to the bobbin and configured to contact the display panel.

According to some embodiments of the present disclosure, the vibration member includes a vibration plate on an upper portion of the bobbin; and a magnetic plate on the vibration plate and configured to contact the display panel.

According to some embodiments of the present disclosure, the vibration member further includes a coating layer on the magnetic plate and configured to directly contact the display panel.

According to some embodiments of the present disclosure, the rolling module further includes a driving unit and configured to fold or unfold the structure; the structure includes first and second structures connected between the upper portion of the display panel and the driving unit, the first and second structures being parallel to each other; each of the first and second structures includes: a first link part including a first portion connected to the upper portion of the display panel; a second link part including a first portion connected to the driving unit; and a link connection part rotatably connected to each of a second portion of the first link part and a second portion of the second link part; and the vibration device is at the link connection part.

According to some embodiments of the present disclosure, the vibration device includes a first vibration device at a first side of the link connection part of the structure; and a second vibration device at a second side of the link connection part of the structure.

According to some embodiments of the present disclosure, the vibration device includes a first vibration device at a first side of the link connection part of the first structure; a second vibration device at a second side of the link connection part of the first structure; a third vibration device at a first side of the link connection part of the second structure; and a fourth vibration device at a second side of the link connection part of the second structure.

According to some embodiments of the present disclosure, the vibration device includes a first vibration device at a first side or a second side of the link connection part of the first structure; and a second vibration device at a first side or a second side of the link connection part of the second structure.

According to some embodiments of the present disclosure, the first vibration device moves in a rectilinear direction with folding and unfolding of the first structure; the second vibration device moves in a diagonal direction with the folding and unfolding of the first structure; the third vibration device moves in a rectilinear direction with folding and unfolding of the second structure; and the fourth vibration device moves in a diagonal direction with the folding and unfolding of the second structure.

According to an embodiment of the present disclosure, a display apparatus may include a display panel including a plurality of pixels and configured to display an image; a back cover on a rear surface of the display panel; a roller on which the display panel is wound or unwound; a rolling module including a structure connected to an upper portion of the display panel and configured to wind or unwind the display panel according to a folding or unfolding of the structure; and a vibration device at the structure and configured to vibrate the display panel when unwound from the roller, wherein the vibration device includes a sound box connected to the structure; and a vibration generator movable in the sound box and configured to contact the back cover.

According to some embodiments of the present disclosure, the display apparatus further includes a housing module including the roller.

According to some embodiments of the present disclosure, the back cover includes a mesh structure.

According to some embodiments of the present disclosure, the vibration generator includes a module frame in the sound box; a bobbin in the module frame; a magnet inside or outside the bobbin; a coil wound around the bobbin; and a vibration member connected to the bobbin and configured to contact the display panel.

According to some embodiments of the present disclosure, the vibration member includes a vibration plate on an upper portion of the bobbin; and a magnetic plate on the vibration plate and configured to contact the display panel.

According to some embodiments of the present disclosure, the vibration member further includes a coating layer on the magnetic plate and configured to directly contact the display panel.

According to some embodiments of the present disclosure, the vibration member further includes the vibration device further includes a movement member in a space in the sound box and configured to flexibly support the vibration generator; and the vibration generator is configured to move according to a shape of a contact surface of the display panel.

According to some embodiments of the present disclosure, the vibration device further includes a heat sink on a rear surface of the vibration generator.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations may be made in the present disclosure without departing from the spirit or scope of the disclosures. Thus, it may be intended that embodiments of the present disclosure cover the modifications and variations of the disclosure provided they come within the scope of the appended claims and their equivalents.

What is claimed is:

1. A display apparatus, comprising:
a display panel including a plurality of pixels, the display panel being configured to display an image;
a roller on which the display panel is wound or unwound;
a rolling module including a structure connected to an upper portion of the display panel, the rolling module being configured to wind or unwind the display panel according to a folding or unfolding of the structure; and
a vibration device at the structure, the vibration device being configured to vibrate the display panel when unwound from the roller, the vibration device including a vibration generator that contacts a contact surface of the display panel, the vibration generator being configured to move to maintain the contact with the contact surface.

2. The display apparatus of claim 1, further comprising a housing module including the roller.

3. The display apparatus of claim 1, wherein the vibration generator is configured to rotate around one or more of: a first direction, a second direction, and a third direction, and move along one or more of: the first direction, the second direction, and the third direction, according to a shape of the contact surface of the display panel.

4. The display apparatus of claim 1, wherein:
the rolling module further includes a driving unit configured to fold or unfold the structure;
the structure includes:
a first link part including a first portion connected to the upper portion of the display panel;
a second link part including a first portion connected to the driving unit; and
a link connection part rotatably connected to each of:
a second portion of the first link part; and
a second portion of the second link part; and
the vibration device is at the link connection part.

5. The display apparatus of claim 4, wherein:
the vibration device further includes:
a sound box connected to the link connection part, the sound box including a space; and
a movement member in the space, the movement member flexibly supporting the vibration generator; and
the movement member is deformed according to a movement of the vibration generator based on a shape of the contact surface of the display panel.

6. The display apparatus of claim 5, wherein the movement member includes a flexible material.

7. The display apparatus of claim 5, wherein the movement member includes:
a body frame connected to the sound box; and
a supporting portion extending from an inner surface of the body frame, the supporting portion flexibly supporting the vibration generator.

8. The display apparatus of claim 7, wherein the vibration device further includes a heat sink connected to a rear surface of the vibration generator.

9. The display apparatus of claim 8, wherein the heat sink is configured to move according to a movement of the supporting portion in a space between a rear surface of the sound box and the movement member.

10. The display apparatus of claim 8, wherein:
the supporting portion includes an opening overlapping the vibration generator; and
the vibration device further includes an adhesive member adhering the heat sink to the vibration generator.

11. The display apparatus of claim 5, wherein the movement member includes a plurality of elastic members connected between the vibration generator and the sound box.

12. The display apparatus of claim 11, wherein the vibration device further includes a heat sink on a rear surface of the vibration generator.

13. The display apparatus of claim 1, wherein the vibration generator includes:

a module frame supported by a movement member in the vibration device;
a bobbin in the module frame;
a magnet inside or outside the bobbin;
a coil wound around the bobbin; and
a vibration member connected to the bobbin, the vibration member contacting the display panel.

14. The display apparatus of claim 13, wherein the vibration member includes:
a vibration plate on an upper portion of the bobbin; and
a magnetic plate on the vibration plate, the magnetic plate contacting the display panel.

15. The display apparatus of claim 14, wherein the vibration member further includes a coating layer on the magnetic plate, the coating layer directly contacting the display panel.

16. The display apparatus of claim 4, wherein the vibration device includes:
a first vibration device at a first side of the link connection part of the structure; and
a second vibration device at a second side of the link connection part of the structure.

17. A display apparatus, comprising:
a display panel including a plurality of pixels, the display panel being configured to display an image;
a back cover on a rear surface of the display panel;
a roller on which the display panel is wound or unwound;
a rolling module including a structure connected to an upper portion of the display panel, the rolling module being configured to wind or unwind the display panel according to a folding or unfolding of the structure; and
a vibration device at the structure, the vibration device being configured to vibrate the display panel when unwound from the roller, the vibration device including:
a sound box connected to the structure; and
a vibration generator movable in the sound box, the sound box contacting the back cover.

18. The display apparatus of claim 17, further comprising a housing module including the roller.

19. The display apparatus of claim 17, wherein the back cover includes a mesh structure.

20. The display apparatus of claim 17, wherein the vibration generator includes:
a module frame in the sound box;
a bobbin in the module frame;
a magnet inside or outside the bobbin;
a coil wound around the bobbin; and
a vibration member connected to the bobbin, the vibration member contacting the display panel.

21. The display apparatus of claim 20, wherein the vibration member includes:
a vibration plate on an upper portion of the bobbin; and
a magnetic plate on the vibration plate, the magnetic plate contacting the display panel.

22. The display apparatus of claim 21, wherein the vibration member further includes a coating layer on the magnetic plate, the coating layer directly contacting the display panel.

23. The display apparatus of claim 20, wherein:
the vibration device further includes a movement member in a space in the sound box, the movement member being configured to flexibly support the vibration generator; and
the vibration generator is configured to move according to a shape of a contact surface of the display panel.

24. The display apparatus of claim 23, wherein the vibration device further includes a heat sink on a rear surface of the vibration generator.

25. The display apparatus of claim 1, wherein:
the rolling module further includes a driving unit, the driving unit being configured to fold or unfold the structure;
the structure includes first and second structures connected between the upper portion of the display panel and the driving unit, the first and second structures being parallel to each other;
each of the first and second structures includes:
a first link part including a first portion connected to the upper portion of the display panel;
a second link part including a first portion connected to the driving unit; and
a link connection part rotatably connected to each of:
a second portion of the first link part; and
a second portion of the second link part; and
the vibration device is at the link connection part.

26. The display apparatus of claim 25, wherein the vibration device includes:
a first vibration device at a first side of the link connection part of the first structure;
a second vibration device at a second side of the link connection part of the first structure;
a third vibration device at a first side of the link connection part of the second structure; and
a fourth vibration device at a second side of the link connection part of the second structure.

27. The display apparatus of claim 25, wherein the vibration device includes:
a first vibration device at a first side or a second side of the link connection part of the first structure; and
a second vibration device at a first side or a second side of the link connection part of the second structure.

28. The display apparatus of claim 26, wherein:
the first vibration device is configured to move in a rectilinear direction with folding and unfolding of the first structure;
the second vibration device is configured to move in a diagonal direction with the folding and unfolding of the first structure;
the third vibration device is configured to move in a rectilinear direction with folding and unfolding of the second structure; and
the fourth vibration device is configured to move in a diagonal direction with the folding and unfolding of the second structure.

* * * * *